United States Patent
Leibfarth et al.

(10) Patent No.: US 12,434,219 B2
(45) Date of Patent: Oct. 7, 2025

(54) POLYMERS, FLUORINATED IONIC POLYMER NETWORKS, AND METHODS RELATED THERETO

(71) Applicant: The University of North Carolina at Chapel Hill, Chapel Hill, NC (US)

(72) Inventors: Frank Leibfarth, Carrboro, NC (US); Elango Kumarasamy, Ithaca, NY (US); Irene Manning, Carrboro, NC (US)

(73) Assignee: THE UNIVERSITY OF NORTH CAROLINA AT CHAPEL HILL, Chapel Hill, NC (US)

( * ) Notice: Subject to any disclaimer, the term of this patent is extended or adjusted under 35 U.S.C. 154(b) by 579 days.

(21) Appl. No.: 17/637,188

(22) PCT Filed: Aug. 21, 2020

(86) PCT No.: PCT/US2020/047365
§ 371 (c)(1),
(2) Date: Feb. 22, 2022

(87) PCT Pub. No.: WO2021/041198
PCT Pub. Date: Mar. 4, 2021

(65) Prior Publication Data
US 2022/0305458 A1   Sep. 29, 2022

Related U.S. Application Data

(60) Provisional application No. 62/891,111, filed on Aug. 23, 2019.

(51) Int. Cl.
 *B01J 20/26* (2006.01)
 *B01J 20/28* (2006.01)
 (Continued)

(52) U.S. Cl.
 CPC ....... *B01J 20/264* (2013.01); *B01J 20/28007* (2013.01); *B01J 20/28016* (2013.01);
 (Continued)

(58) Field of Classification Search
 CPC ............... B01J 20/264; B01J 20/28007; B01J 20/28016; B01J 20/28033; B01J 20/3425;
 (Continued)

(56) References Cited

U.S. PATENT DOCUMENTS

| | | |
|---|---|---|
| 2005/0173347 A1 | 8/2005 | Hintzer et al. |
| 2016/0046506 A1 | 2/2016 | Bruzzano et al. |
| 2017/0297926 A1 | 10/2017 | Nickelsen et al. |

FOREIGN PATENT DOCUMENTS

| | | |
|---|---|---|
| JP | 2014231056 A | 12/2014 |

OTHER PUBLICATIONS

Johnson et al., "Advanced Filtration Membranes for the Removal of Perfluoroalkyl Species from Water", ACS Omega, 2019, vol. 4, pp. 8001-8006.
(Continued)

*Primary Examiner* — Pranav N Patel
(74) *Attorney, Agent, or Firm* — Ballard Spahr LLP

(57) ABSTRACT

Disclosed herein are materials and methods related to the removal of a polyfluorinated alkyl compound from water. The materials contain both fluorine and an ion, which materials can be used as a network to remove the polyfluorinated alkyl compound from water.

17 Claims, 20 Drawing Sheets

(51) Int. Cl.
*B01J 20/34* (2006.01)
*C02F 1/28* (2023.01)
*C08F 212/34* (2006.01)
*C02F 101/36* (2006.01)

(52) U.S. Cl.
CPC ..... *B01J 20/28033* (2013.01); *B01J 20/3425* (2013.01); *B01J 20/3475* (2013.01); *C02F 1/285* (2013.01); *C08F 212/34* (2013.01); *C02F 2101/36* (2013.01); *C02F 2303/16* (2013.01)

(58) Field of Classification Search
CPC ...... B01J 20/3475; B01J 20/262; B01J 41/05; C02F 1/285; C02F 2101/36; C02F 2303/16; C02F 2101/14; C02F 2101/301; C02F 2103/38; C08F 212/34; C08F 220/285; Y02W 10/37

See application file for complete search history.

(56) References Cited

OTHER PUBLICATIONS

International Search Report and Written Opinion were mailed Jan. 14, 2021 by the International Searching Authority for International Application No. PCT/US 20/47365 filed on Aug. 21, 2020 and published as WO 2021/041198A1 (Applicant—The University of North Carolina at Chapel Hill) (10 pages).

Ateia et al. (2019) "Cationic polymer for selective removal of GenX and short-chain PFAS from surface waters and wastewaters at ng/L levels," *Water Research* 163: 114874.

Huang et al. (2018) "Reusable Functionalized Hydrogel Sorbents for Removing Long- and Short-Chain Perfluoroalkyl Acids (PFAAs) and GenX from Aqueous Solution," *ACS Omega* 3(12): 17447-17455.

Koda et al. (2014) "Fluorous Microgel Star Polymers: Selective Recognition and Separation of Polyfluorinated Surfactants and Compounds in Water," *Journal of the American Chemical Society* 136(44): 15742-15748.

Koda et al. (2015) "Star Polymer Gels with Fluorinated Microgels via Star-Star Coupling and Cross-Linking for Water Purification," *ACS Macro Letters* 4(4): 377-380.

POLYMERS, FLUORINATED IONIC POLYMER NETWORKS, AND METHODS RELATED THERETO

CROSS-REFERENCE TO RELATED APPLICATIONS

This Application is a U.S. National Phase Application of International Application No. PCT/US2020/047365, filed Aug. 21, 2020, which claims the benefit of U.S. Provisional Application No. 62/891,111, filed on Aug. 23, 2019, each of which are incorporated herein by reference in their entirety.

BACKGROUND

Per- and poly-fluorinated alkyl substances (PFAS) is a class of fluorinated compounds that are widely used as surfactants in the production of poly(tetrafluoroethylene) (Teflon), as water/stain repellant coatings in consumer products, and as components of fire retardants in aqueous film forming foams (AFFF) (Banks, R. E.; Smart, *Organofluorine Chemistry: Principles and Commercial Applications*; Springer US: Boston, MA, 1994; Knepper, T. P., *Polyfluorinated Chemicals and Transformation Products*; Springer Science & Business Media, 2011; Vol. 17; Kotthoff, M.; *Environ. Sci. Pollut. Res.* 2015, 22 (19), 14546-14559; Lindstrom, A. B.; Strynar, M. J.; Libelo, E. L. Polyfluorinated Compounds: Past, Present, and Future. *Environ. Sci. Technol.* 2011, 45 (19), 7954-7961). PFAS are distributed widely from contamination sites through waterways (Hu, X. et al., *Environ. Sci. Technol. Lett.* 2016, 3 (10), 344-350)), and their long-term ecological persistence and adverse human health effects (Darrow, L. A.; *Environ. Health Perspect.* 2016, 124 (8), 1227-1233; Quaak, I.; de Cock, *Int. J. Environ. Res. Public Health* 2016, 13 (5), 511; Kataria, A.; Trachtman, H., *Environ. Heal.* 2015, 14 (1), 89; Barry, V. *Environ. Health Perspect.* 2013, 121 (11-12), 1313-1318; Melzer, D., *Environ. Health Perspect.* 2010, 118 (5), 686-692; Chang, E. T., *Crit. Rev. Toxicol.* 2016, 46 (4), 279-331) has resulted in increased regulatory attention to the concentration of PFAS in finished drinking water (Sun, M., *Environ. Sci. Technol. Lett.* 2016, 3 (12), 415-419; Cousins, I. T., *Environ. Int.* 2016, 94, 331-340). The U.S. Environmental Protection Agency (EPA) has set a lifetime health advisory level (HAL) of 70 ng/L for the combined concentration of perfluorooctanoic acid (PFOA) and perfluoro-1-octane sulfonic acid (PFOS) in drinking water (Boone, J. S.; *Sci. Total Environ.* 2019, 653, 359-369; *Drinking Water Health Advisory for Perfluorooctanoic Acid (PFOA)*; 2016). Consequently, PFOA and PFOS were phased out in the United States in 2015 and were replaced with short chain PFASs, such as perfluoro-2-propoxypropanoic acid (GenX) (Strynar, M.; *Environ. Sci. Technol.* 2015, 49 (19), 11622-11630), which demonstrate similar bioaccumulation potential (Mccord, J.; *Environ. Sci. Technol.* 2019, 53, 4717-4727). As a result, the state of North Carolina has set an upper limit of 140 ng/L for GenX as an emerging contaminant in drinking water.

Thus, there is a need to remove polyfluorinated alkyl compounds from water to make it safer for the public. Disclosed herein are materials, polymers and methods useful in the removal of polyfluorinated alkyl compound from water.

SUMMARY

In accordance with the purpose(s) of the invention, as embodied and broadly described herein, the invention, in one aspect, relates to fluorinated ionic polymer networks and methods related thereto.

Disclosed herein is a method of removing a polyfluorinated alkyl compound from water, the method comprising absorbing the polyfluorinated alkyl compound from the water with a fluorinated ionic polymer network.

Also disclosed here is a co-polymer made from: a monomer comprising an ion generating moiety having the structure

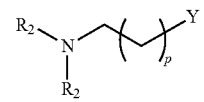

wherein each $R_2$ group independently is H, C1-C6 alkyl, C1-C6 fluoroalkyl, aryl, or fluoroaryl,
wherein p is from 0-11, and wherein Y is a polymerizable group, or a monomer comprising an ion having the structure

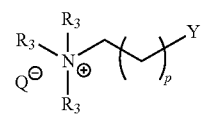

wherein each $R_3$ group independently is H, C1-C6 alkyl, C1-C6 fluoroalkyl, aryl, or fluoroaryl,
wherein p is from 0-11, wherein Y is a polymerizable group, and wherein Q is a counter ion, or a monomer comprising an ion having the structure

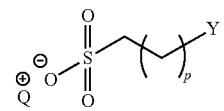

wherein p is from 0-11, wherein Y is a polymerizable group, and wherein Q is a counter ion, or a monomer comprising an ion having the structure

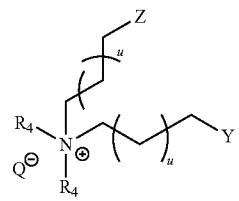

wherein each $R_4$ group independently is H, C1-C6 alkyl, C1-C6 fluoroalkyl, aryl, or fluoroaryl,
wherein each u is independently from 0-10, wherein Y is a polymerizable group, wherein Z is an anionic group or a polymerizable group, and wherein Q is a counter ion, and a monomer comprising a fluorine having the structure

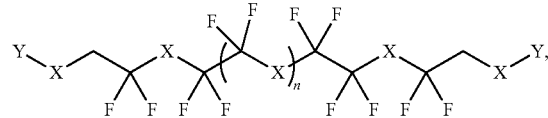

-continued

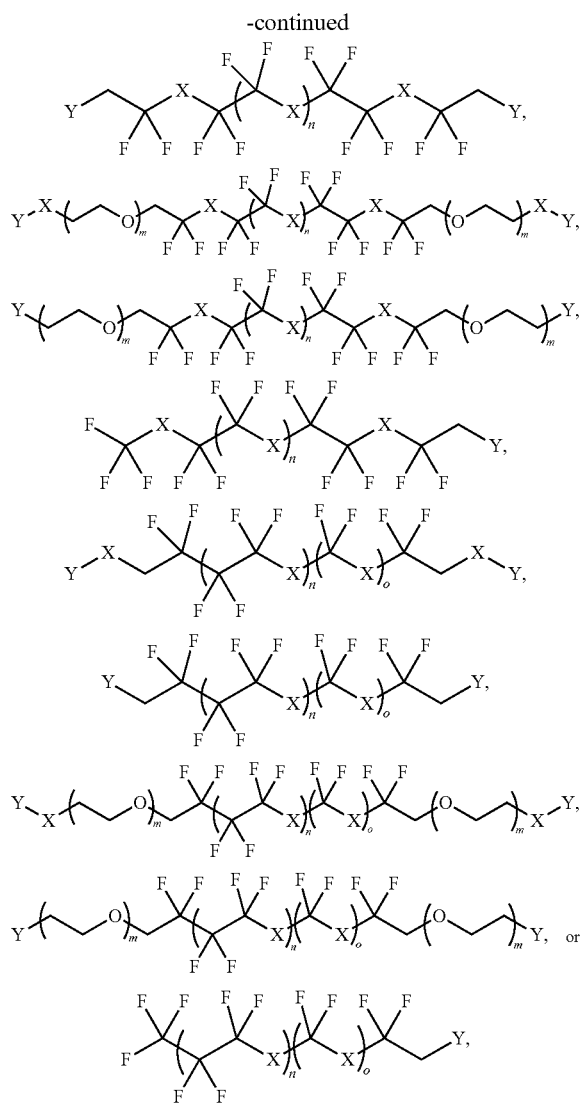

wherein each X is individually $CF_2$ or O, wherein each Y is polymerizable group, wherein n is from 0-100, wherein o is from 0-100, and wherein each m is individually from 1-30.

Also disclosed here is a membrane comprising a fluorinated ionic polymer network disclosed herein While aspects of the present invention can be described and claimed in a particular statutory class, such as the system statutory class, this is for convenience only and one of skill in the art will understand that each aspect of the present invention can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

BRIEF DESCRIPTION OF THE FIGURES

The accompanying figures, which are incorporated in and constitute a part of this specification, illustrate several aspects and together with the description serve to explain the principles of the invention.

Figure 1A:
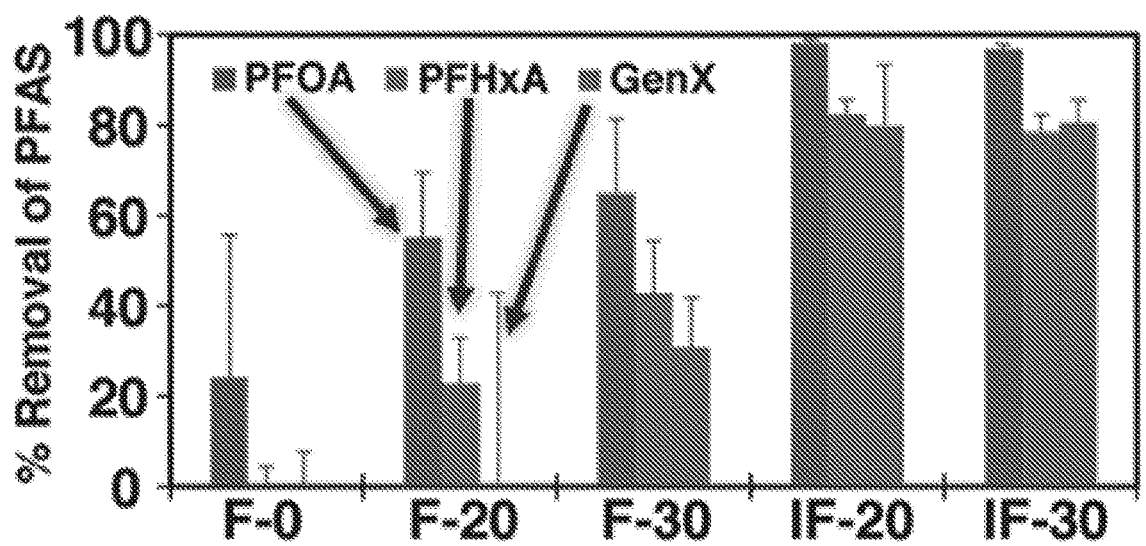
FIGS. 1A-1F show efficiency and equilibrium of PFAS removal with fluorinated ionic polymer networks.

Additional advantages of the invention will be set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION

The present invention can be understood more readily by reference to the following detailed description of the invention and the Examples included therein.

Before the present compounds, compositions, articles, devices, and/or methods are disclosed and described, it is to be understood that they are not limited to specific synthetic methods unless otherwise specified, or to particular reagents unless otherwise specified, as such may, of course, vary. It is also to be understood that the terminology used herein is for the purpose of describing particular aspects only and is not intended to be limiting. Although any methods and materials similar or equivalent to those described herein can be used in the practice or testing of the present invention, example methods and materials are now described.

Although any methods and materials similar or equivalent to those described herein can be used in the practice or testing of the present invention, example methods and materials are now described.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided herein may be different from the actual publication dates, which can require independent confirmation.

A. Definitions

As used herein, nomenclature for compounds, including organic compounds, can be given using common names, IUPAC, IUBMB, or CAS recommendations for nomenclature. When one or more stereochemical features are present, Cahn-Ingold-Prelog rules for stereochemistry can be employed to designate stereochemical priority, E/Z specification, and the like. One of skill in the art can readily ascertain the structure of a compound if given a name, either by systemic reduction of the compound structure using naming conventions, or by commercially available software, such as CHEMDRAW™ (Cambridgesoft Corporation, U.S.A.).

As used in the specification and the appended claims, the singular forms "a," "an" and "the" include plural referents unless the context clearly dictates otherwise. Thus, for example, reference to "a component," "a polymer," or "a particle" includes mixtures of two or more such components, polymers, or particles, and the like.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that when a value is disclosed that "less than or equal to" the value, "greater than or equal to the value" and possible ranges between values are also disclosed, as appropriately understood by the skilled artisan. For example, if the value "10" is disclosed the "less than or equal to 10" as well as "greater than or equal to 10" is also disclosed. It is also understood that throughout the application, data is provided in a number of different formats and that this data represents endpoints and starting points, and ranges for any combination of the data points. For example, if a particular data point "10" and a particular data point 15 are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

References in the specification and concluding claims to parts by weight of a particular element or component in a composition denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent (wt. %) of a component, unless specifically stated to the contrary, is based on the total weight of the formulation or composition in which the component is included.

As used herein, the terms "optional" or "optionally" means that the subsequently described event or circumstance may or may not occur, and that the description includes instances where said event or circumstance occurs and instances where it does not.

The term "stable," as used herein, refers to compositions that are not substantially altered when subjected to conditions to allow for their production, detection, and, in certain aspects, their recovery, purification, and use for one or more of the purposes disclosed herein.

As used herein, the term "derivative" refers to a compound having a structure derived from the structure of a parent compound (e.g., a compound disclosed herein) and whose structure is sufficiently similar to those disclosed herein and based upon that similarity, would be expected by one skilled in the art to exhibit the same or similar activities and utilities as the claimed compounds, or to induce, as a precursor, the same or similar activities and utilities as the claimed compounds. Exemplary derivatives include salts, esters, amides, salts of esters or amides, and N-oxides of a parent compound. One ordinary skill in the art would understand the structure of a derivative, such as a cholesterol derivative.

As used herein, the term "polymer" refers to a relatively high molecular weight organic compound, natural or synthetic, whose structure can be represented by a repeated small unit, the monomer (e.g., polyethylene, rubber, cellulose). Synthetic polymers are typically formed by addition or condensation polymerization of monomers.

As used herein, the term "homopolymer" refers to a polymer formed from a single type of repeating unit (monomer residue).

As used herein, the term "copolymer" refers to a polymer formed from two or more different repeating units (monomer residues). By way of example and without limitation, a copolymer can be an alternating copolymer, a random copolymer, a block copolymer, or a graft copolymer. It is also contemplated that, in certain aspects, various block segments of a block copolymer can themselves comprise copolymers.

As used herein, the term "oligomer" refers to a relatively low molecular weight polymer in which the number of repeating units is between two and ten, for example, from two to eight, from two to six, or from two to four. In one aspect, a collection of oligomers can have an average number of repeating units of from about two to about ten, for example, from about two to about eight, from about two to about six, or form about two to about four.

As used herein, the term "cross-linked polymer" refers to a polymer having bonds linking one polymer chain to another.

The term "alkyl" as used herein is a branched or unbranched saturated hydrocarbon group of 1 to 24 carbon atoms, such as methyl, ethyl, n-propyl, isopropyl, n-butyl, isobutyl, s-butyl, t-butyl, n-pentyl, isopentyl, s-pentyl, neopentyl, hexyl, heptyl, octyl, nonyl, decyl, dodecyl, tetradecyl, hexadecyl, eicosyl, tetracosyl, and the like. The alkyl group can be cyclic or acyclic. The alkyl group can be branched or unbranched. The alkyl group can also be substituted or unsubstituted. For example, the alkyl group can be substituted with one or more groups including, but not limited to, alkyl, cycloalkyl, alkoxy, amino, ether, halide, hydroxy, nitro, silyl, sulfo-oxo, or thiol, as described herein. A "lower alkyl" group is an alkyl group containing from one to six (e.g., from one to four) carbon atoms. Non-limiting examples of alkyls include C1-18 alkyl, C1-C12 alkyl, C1-C8 alkyl, C1-C6 alkyl, C1-C3 alkyl, and C1 alkyl.

Throughout the specification "alkyl" is generally used to refer to both unsubstituted alkyl groups and substituted alkyl groups; however, substituted alkyl groups are also specifically referred to herein by identifying the specific substituent(s) on the alkyl group. For example, the term "halogenated alkyl" or "haloalkyl" specifically refers to an alkyl group that is substituted with one or more halide, e.g., fluorine, chlorine, bromine, or iodine. The term "alkoxyalkyl" specifically refers to an alkyl group that is substituted with one or more alkoxy groups, as described below. The term "alkylamino" specifically refers to an alkyl group that is substituted with one or more amino groups, as described below, and the like. When "alkyl" is used in one instance and a specific term such as "alkylalcohol" is used in another, it is not meant to imply that the term "alkyl" does not also refer to specific terms such as "alkylalcohol" and the like.

The term "alkenyl" as used herein is a hydrocarbon group of 2 to 24 carbon atoms with a structural formula containing at least one carbon-carbon double bond. The alkenyl group can be unsubstituted or substituted with one or more groups including, but not limited to, alkyl, cycloalkyl, alkoxy, alkenyl, cycloalkenyl, alkynyl, cycloalkynyl, aryl, heteroaryl, aldehyde, amino, carboxylic acid, ester, ether, halide, hydroxy, ketone, azide, nitro, silyl, sulfo-oxo, or thiol, as described herein. Non-limiting examples of alkenyls include C2-18 alkenyl, C2-12 alkenyl, C2-8 alkenyl, C2-6 alkenyl, and C2-3 alkenyl.

The term "alkynyl" as used herein is a hydrocarbon group of 2 to 24 carbon atoms with a structural formula containing at least one carbon-carbon triple bond. The alkynyl group can be unsubstituted or substituted with one or more groups including, but not limited to, alkyl, cycloalkyl, alkoxy, alkenyl, cycloalkenyl, alkynyl, cycloalkynyl, aryl, heteroaryl, aldehyde, amino, carboxylic acid, ester, ether, halide, hydroxy, ketone, azide, nitro, silyl, sulfo-oxo, or thiol, as described herein. Non-limiting examples of alkynyls include C2-18 alkynyl, C2-12 alkynyl, C2-8 alkynyl, C2-6 alkynyl, and C2-3 alkynyl.

The terms "amine" or "amino" as used herein are represented by the formula $—NA^1A^2$, where $A^1$ and $A^2$ can be, independently, hydrogen or alkyl, cycloalkyl, alkenyl, cycloalkenyl, alkynyl, cycloalkynyl, aryl, or heteroaryl group as described herein.

The term "ester" as used herein is represented by the formula $—OC(O)A^1$ or $—C(O)OA^1$, where $A^1$ can be alkyl, cycloalkyl, alkenyl, cycloalkenyl, alkynyl, cycloalkynyl, aryl, or heteroaryl group as described herein. The term "polyester" as used herein is represented by the formula $—(A^1O(O)C—A^2—C(O)O)_a—$ or $—(A^1O(O)C—A^2—OC(O))_a—$, where $A^1$ and $A^2$ can be, independently, an alkyl, cycloalkyl, alkenyl, cycloalkenyl, alkynyl, cycloalkynyl, aryl, or heteroaryl group described herein and "a" is an integer from 1 to 500. "Polyester" is used to describe a group that is produced by the reaction between a compound having at least two carboxylic acid groups with a compound having at least two hydroxyl groups.

The term "ether" as used herein is represented by the formula $A^1OA^2$, where $A^1$ and $A^2$ can be, independently, an alkyl, cycloalkyl, alkenyl, cycloalkenyl, alkynyl, cycloalkynyl, aryl, or heteroaryl group described herein. The term "polyether" as used herein is represented by the formula $—(A^1O—A^2O)_a—$, where $A^1$ and $A^2$ can be, independently, an alkyl, cycloalkyl, alkenyl, cycloalkenyl, alkynyl, cycloalkynyl, aryl, or heteroaryl group described herein and "a" is an integer of from 1 to 500. Examples of polyether groups include polyethylene oxide, polypropylene oxide, and polybutylene oxide.

The term "azide" as used herein is represented by the formula $—N_3$.

The term "thiol" as used herein is represented by the formula —SH.

Compounds described herein can contain one or more double bonds and, thus, potentially give rise to cis/trans (E/Z) isomers, as well as other conformational isomers. Unless stated to the contrary, the invention includes all such possible isomers, as well as mixtures of such isomers.

Certain materials, compounds, compositions, and components disclosed herein can be obtained commercially or readily synthesized using techniques generally known to those of skill in the art. For example, the starting materials and reagents used in preparing the disclosed compounds and compositions are either available from commercial suppliers such as Aldrich Chemical Co., (Milwaukee, Wis.), Acros Organics (Morris Plains, N.J.), Fisher Scientific (Pittsburgh, Pa.), or Sigma (St. Louis, Mo.) or are prepared by methods known to those skilled in the art following procedures set forth in references such as Fieser and Fieser's Reagents for Organic Synthesis, Volumes 1-17 (John Wiley and Sons, 1991); Rodd's Chemistry of Carbon Compounds, Volumes 1-5 and Supplemental volumes (Elsevier Science Publishers, 1989); Organic Reactions, Volumes 1-40 (John Wiley and Sons, 1991); March's Advanced Organic Chemistry, (John Wiley and Sons, 4th Edition); and Larock's Comprehensive Organic Transformations (VCH Publishers Inc., 1989).

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

Disclosed are the components to be used to prepare the compositions of the invention as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds may not be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the invention. Thus, if there are a variety of additional steps that can be performed it is understood that each of these additional steps can be performed with any specific aspect or combination of aspects of the methods of the invention.

The terms per- and poly fluorinated alkyl substances (PFAS) and polyfluorinated alkyl compounds are used interchangeably herein.

It is understood that the compositions disclosed herein have certain functions. Disclosed herein are certain structural requirements for performing the disclosed functions, and it is understood that there are a variety of structures that can perform the same function that are related to the disclosed structures, and that these structures will typically achieve the same result.

B. Materials, Polymers, and Methods

PFAS contaminate ground, surface, and finished drinking water internationally. Their ecological persistence and adverse human health effects demand effective remediation approaches. Disclosed herein are materials, polymers, and methods that effectively remove a polyfluorinated alkyl compound from water. Polyfluorinated alkyl compounds can have chemically diverse structures and the disclosed materials, polymers, and methods can remove these chemically diverse structures of polyfluorinated alkyl compounds from water.

The primary challenge for developing a resin for the removal of polyfluorinated alkyl compounds from water is that non-fluorinated organic and inorganic species are present in ground water or surface waters at three to eight orders of magnitude higher concentration than polyfluorinated alkyl compounds (Ross, I.; *Remediation* 2018, 28 (2), 101-126). Current technologies typically absorb waterborne contaminants non-specifically, resulting in a saturation by non-fluorinated species, such that the polyfluorinated alkyl compounds mostly remain in the water. For example, current of polyfluorinated alkyl compounds removal efforts use granular activated carbon (GAC), which provides for modest treatment volumes for short-chain polyfluorinated alkyl compounds (Hopkins, Z. R., *J. Am. Water Works Assoc.* 2018, 110 (7), 13-28). Furthermore, the binding affinities of organic contaminants to these resins is often higher than those of polyfluorinated alkyl compounds, which can result in polyfluorinated alkyl compound displacement and concentration in filtered water over time (Schachtman, B. *Port City Daily*. Wilmington, NC 2019). Current technologies include porous organic polymer absorbents (Alsbaiee, A., *Nature* 2016, 529 (7585), 190-194; Xiao, L., *J. Am. Chem. Soc.* 2017, 139, 7680-7692; Ling, Y., *Environ. Sci. Technol.* 2017, 51, 7590-7598; Xiao, L., *Macromolecules* 2019, 52, 3747-3752; Klemes, M. J., *Angew. Chemie Int. Ed.* 2019; Ji, W., *J. Am. Chem. Soc.* 2018, 140 (40), 12677-12681; Cao, F., *J. Appl. Polym. Sci.* 2016, 133 (15), 1-10; Yu, Q., *Water Res.* 2008, 42 (12), 3089-3097) and ion exchange materials that contain a fluorinated component (Huang, P. J., *ACS Omega* 2018, 3 (12), 17447-17455; Ateia, M., *Environ. Sci. Technol. Lett.* 2018, 5 (12), 764-769; Koda, Y., *J. Am. Chem. Soc.* 2014, 136, 15742-15748; Koda, Y., *ACS Macro Lett.* 2015, 4 (4), 377-380). While these polymers can absorb long-chain polyfluorinated alkyl compounds, they display modest selectivity for short-chain polyfluorinated alkyl compounds.

Disclosed herein are materials that utilizes both fluorophilic sorption and targeted ion exchange for the removal of polyfluorinated alkyl compounds from water. The materials, polymers, and methods disclosed herein leverages the fluorophilicity of the polyfluorinated alkyl compounds to selectively partition these micropollutants into a resin. The materials, polymers, and methods disclosed herein can utilize a tunable density of charged functional groups that can enable ion exchange and sequestration of charged polyfluorinated alkyl compounds.

1. Methods

Disclosed herein is a method of removing a polyfluorinated alkyl compound from water, the method comprising absorbing the polyfluorinated alkyl compound from the water with a fluorinated ionic polymer network. As disclosed herein, the fluorinated ionic polymer network utilizes both fluorophilic sorption and targeted ion exchange for the removal of polyfluorinated alkyl compounds from water.

In one aspect, the polyfluorinated alkyl compound is a short chain polyfluorinated alkyl compound having from 2 to 6 carbon atoms. In another aspect, the polyfluorinated alkyl compound is a long chain polyfluorinated alkyl compound having from 7 to 50 carbon atoms.

In one aspect, prior to performing the method the water has a concentration of the polyfluorinated alkyl compound from 2 to 500,000 ng/L. For example, the water can have a concentration of the polyfluorinated alkyl compound from 50 to 500,000 ng/L. In another example, the water can have a concentration of the polyfluorinated alkyl compound from 100 to 500,000 ng/L. In yet another example, the water can have a concentration of the polyfluorinated alkyl compound from above 140 to 500,000 ng/L. In yet another example, the water can have a concentration of the polyfluorinated alkyl compound from 150 to 500,000 ng/L. In yet another example, the water can have a concentration of the polyfluorinated alkyl compound from 300 to 500,000 ng/L. In yet another example, the water can have a concentration of the polyfluorinated alkyl compound from 500 to 500,000 ng/L. In yet another example, the water can have a concentration of the polyfluorinated alkyl compound from 1,000 to 500,000 ng/L. In yet another example, the water can have a concentration of the polyfluorinated alkyl compound from 10,000 to 500,000 ng/L. In yet another example, the water can have a concentration of the polyfluorinated alkyl compound from 2 to 100,000 ng/L. In yet another example, the water can have a concentration of the polyfluorinated alkyl compound from 2 to 10,000 ng/L. In yet another example, the water can have a concentration of the polyfluorinated alkyl compound from 2 to 1,000 ng/L. In yet another example, the water can have a concentration of the polyfluorinated alkyl compound from 2 to 500 ng/L. In yet another example, the water can have a concentration of the polyfluorinated alkyl compound from 50 to 5,000 ng/L. In yet another example, the water can have a concentration of the polyfluorinated alkyl compound from above 140 to 5,000 ng/L. In yet another example, the water can have a concentration of the polyfluorinated alkyl compound from 150 to 5,000 ng/L. In yet another example, the water can have a concentration of the polyfluorinated alkyl compound from 150 to 1,000 ng/L.

In one aspect, the method disclosed herein can remove at least 60% of the polyfluorinated alkyl compound from the water. For example, the method disclosed herein can remove at least 65% of the polyfluorinated alkyl compound from the water. In another example, the method disclosed herein can remove at least 70% of the polyfluorinated alkyl compound from the water. In yet another example, the method disclosed herein can remove at least 75% of the polyfluorinated alkyl compound from the water. In yet another example, the method disclosed herein can remove at least 80% of the polyfluorinated alkyl compound from the water. In yet another example, the method disclosed herein can remove at least 85% of the polyfluorinated alkyl compound from the water. In yet another example, the method disclosed herein can remove at least 90% of the polyfluorinated alkyl compound from the water. In yet another example, the method disclosed herein can remove at least 95% of the polyfluorinated alkyl compound from the water. In yet another example, the method disclosed herein can remove at least 97% of the polyfluorinated alkyl compound from the water. In yet another example, the method disclosed herein can remove at least 99% of the polyfluorinated alkyl compound from the water.

In one aspect, the polyfluorinated alkyl compound is dissolved in the water prior to performing the method.

In one aspect, the method further comprises the step of removing the fluorinated ionic polymer network comprising the absorbed polyfluorinated alkyl compound from the water. As such, the removed polyfluorinated alkyl compound is no longer present in the water, either as dissolved in the water or as absorbed in the fluorinated ionic polymer network. Removing the fluorinated ionic polymer network comprising the absorbed polyfluorinated alkyl compound from the water can be done via filtration, where the fluorinated ionic polymer network comprising the absorbed polyfluorinated alkyl compound from the water is filtered from the water. In another aspect, the fluorinated ionic polymer network is a filter or a part of a filter where water containing the polyfluorinated alkyl compound is filtered through the fluorinated ionic polymer network to remove the polyfluorinated alkyl compound.

In one aspect, the method further comprises the step of separating the absorbed polyfluorinated alkyl compound from the fluorinated ionic polymer network. As such, the fluorinated ionic polymer network is regenerated and can be used again to absorb more polyfluorinated alkyl compound from water. In one aspect, the fluorinated ionic polymer network can be regenerated from 2 to 100 times, such as from 2 to 50 times, or from 2 to 25 times.

The fluorinated ionic polymer network can have a positive, negative, or both positive and negative charge. As such, in one aspect, the fluorinated ionic polymer network can be a fluorinated cationic polymer network. In another aspect, the fluorinated ionic polymer network can be a fluorinated anionic polymer network. In one aspect, the fluorinated ionic polymer network can be a fluorinated polymer network that comprises both a cation and an anion. For example, the fluorinated polymer network that comprises both a cation and an anion can comprise a quaternary ammonium and a sulfonate. In yet another aspect, the fluorinated ionic polymer network is a fluorinated zwitterionic polymer network.

The fluorinated ionic polymer network can be made as a network without being ionic, and the ionic species can be from the fluorinated polymer network, thereby generating the fluorinated ionic polymer network. In one aspect, the fluorinated ionic polymer network can be a co-polymer made from a monomer comprising fluorine and a monomer comprising an ion-generating moiety. The ion-generating moiety can be made into an ionic species once the fluorinated polymer network is formed, thereby producing the fluorinated ionic polymer network.

The ion-generating moiety can be any moiety capable of being converted to an ion. In one aspect, the ion is a cation. In one aspect, the ion-generating moiety can be an amine, imidazole, benzimidazole, guanidinium, triazole, pyridine, diazine, triazine, thiol, thioether, phosphorane, or phosphine. For example, the ion-generating moiety can be an amine. For example, the amine can be a tertiary amine that is converted to a quaternary ammonium, for example, via a methylation step. In another example, the ion-generating moiety can be an imidazole. In another example, the ion-generating moiety can be a pyridine. In another example, the ion-generating moiety can be a benzimidazole. In another example, the ion-generating moiety can be a guanidinium. In another example, the ion-generating moiety can be a triazole. In another example, the ion-generating moiety can be a pyridine. In another example, the ion-generating moiety can be a diazine. In another example, the ion-generating moiety can be a triazine. In another example, the ion-generating moiety can be a thiol. In another example, the ion-generating moiety can be a thioether. In another example, the ion-generating moiety can be a phosphorane. In another example, the ion-generating moiety can be a phosphine. In another aspect, the ion is an anion. In one aspect, the ion-generating moiety can be a carboxyl, phorporic, or sulfonic group that can be converted to a carboxylate, phosphate, or sulfonate, respectively.

The fluorinated ionic polymer network can also be made directly from a polymerization where an ionic monomer is used. In one aspect, the fluorinated ionic polymer network is a co-polymer made from a monomer comprising fluorine and a monomer comprising an ion. In one aspect, the monomer comprising an ion can be a monomer comprising a cation. For example, the monomer comprising a cation can comprise a quaternary ammonium or a quaternary phosphonium. In one aspect, the monomer comprising an ion can be a monomer comprising an anion.

In one aspect, the fluorinated ionic polymer network can be a co-polymer made from
a) a monomer comprising an ion generating moiety or a monomer comprising an ion; and
b) a monomer comprising a fluorine having the structure

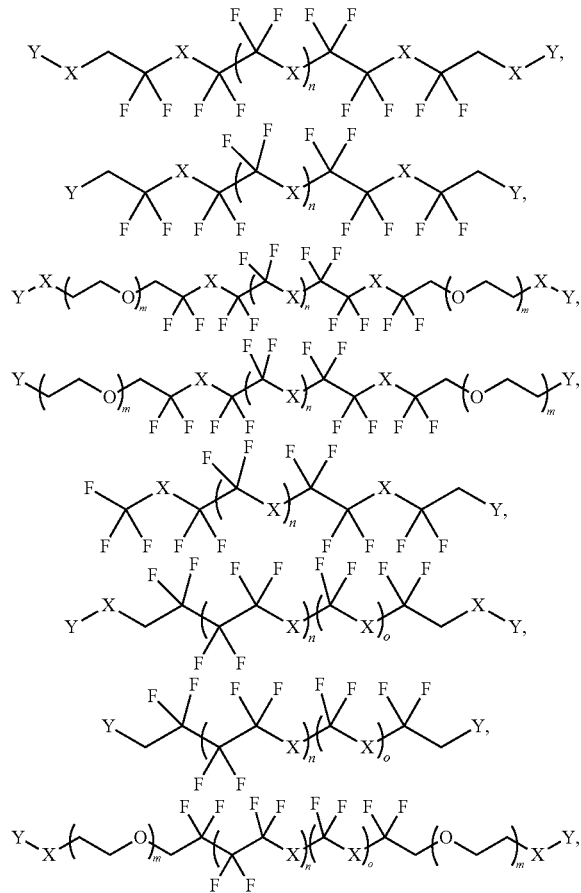

-continued

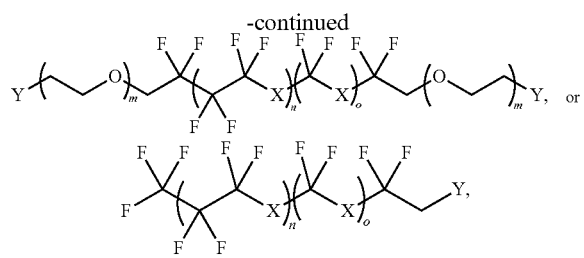

wherein each X is individually $CF_2$ or O,
wherein each Y is polymerizable group,
wherein n is from 0-100,
wherein o is from 0-100, and
wherein each m is individually from 1-30.

In one aspect, the fluorinated ionic polymer network can be a co-polymer made from
a) a monomer comprising an ion generating moiety; and
b) a monomer comprising a fluorine having the structure

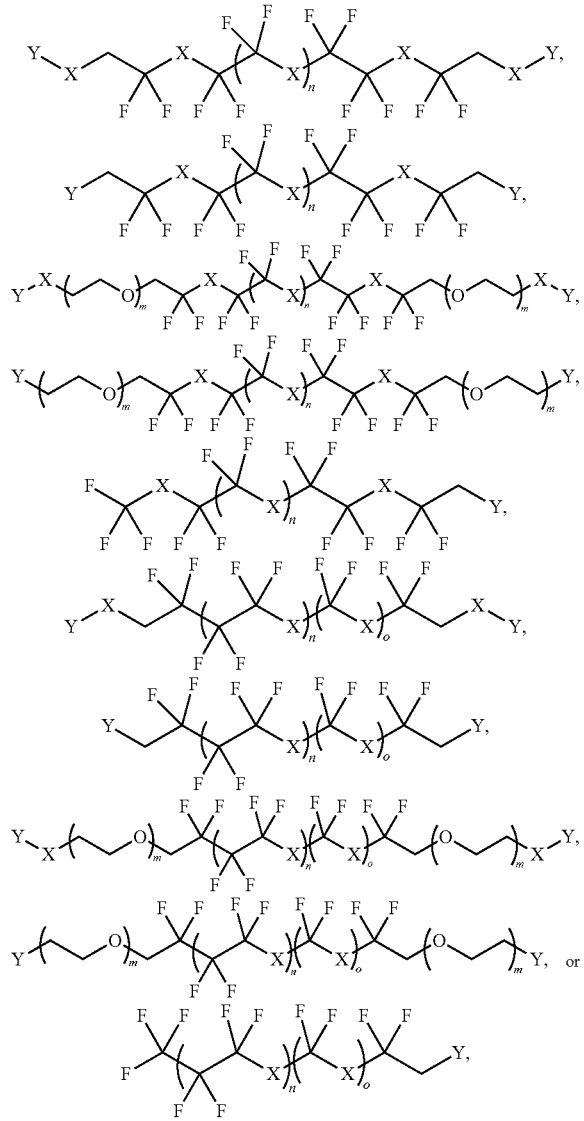

wherein each X is individually $CF_2$ or O,
wherein each Y is polymerizable group,
wherein n is from 0-100,
wherein o is from 0-100, and
wherein each m is individually from 1-30.

In one aspect, the fluorinated ionic polymer network can be a co-polymer made from
a) or a monomer comprising an ion; and
b) a monomer comprising a fluorine having the structure

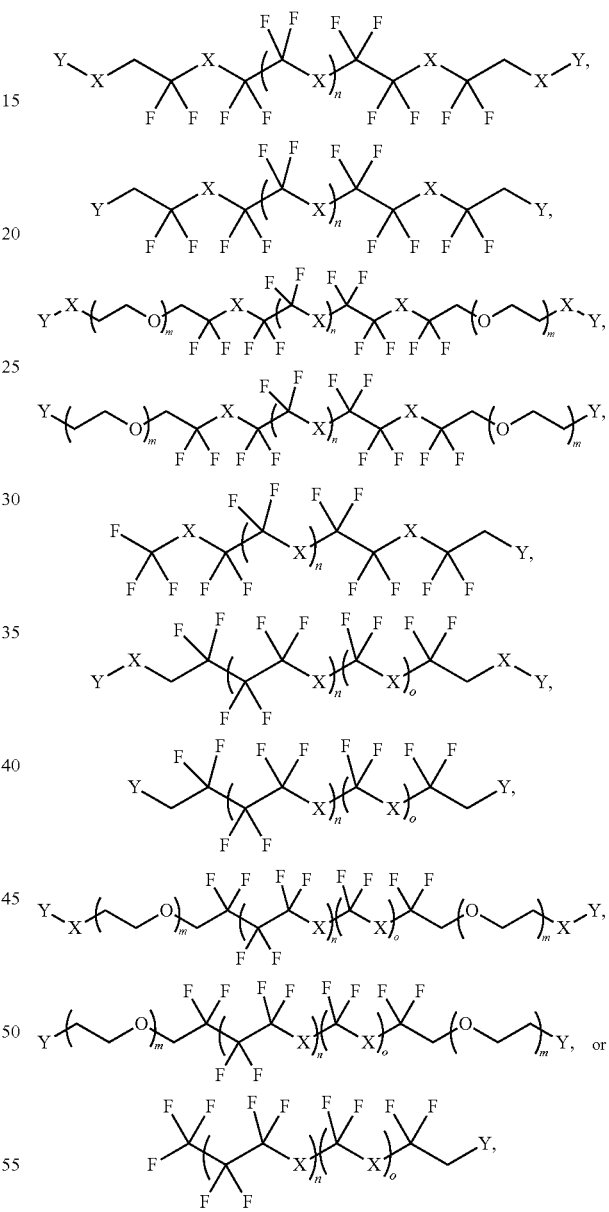

wherein each X is individually $CF_2$ or O,
wherein each Y is polymerizable group,
wherein n is from 0-100,
wherein o is from 0-100, and
wherein each m is individually from 1-30.

In one aspect, the monomer comprising a fluorine has the structure

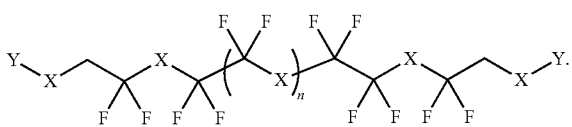

In one aspect, the monomer comprising a fluorine has the structure

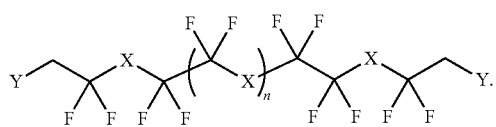

In one aspect, the monomer comprising a fluorine has the structure

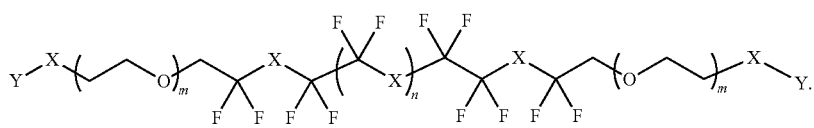

In one aspect, the monomer comprising a fluorine has the structure

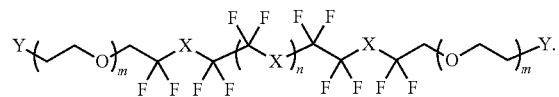

In one aspect, the monomer comprising a fluorine has the structure

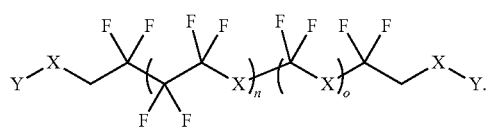

In one aspect, the monomer comprising a fluorine has the structure

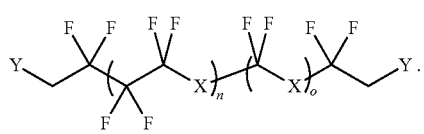

In one aspect, the monomer comprising a fluorine has the structure

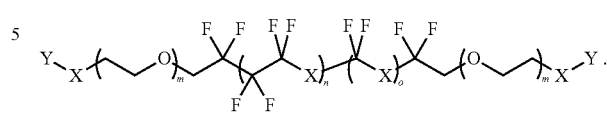

In one aspect, the monomer comprising a fluorine has the structure

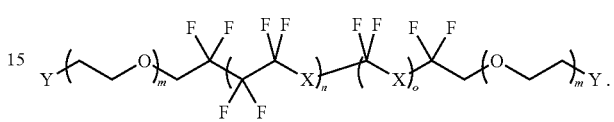

In one aspect, the monomer comprising a fluorine has the structure

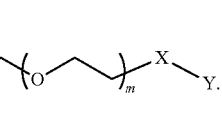

In one aspect, x is $CF_2$. In another aspect, x is O. In yet another aspect, x is S. In yet another aspect, x is N—$R_5$, wherein $R_5$ is H, alkyl, or aryl. For example, $R_5$ can be H. In another example, $R_5$ can be alkyl, such as C1-C6 alkyl, for example C1-C3 alkyl. In another example, $R_5$ can be aryl, for example C6 aryl.

In one aspect, Y is polymerizable group comprising a double bond. In another example, Y is polymerizable group comprising a vinyl group. Polymerizable groups containing vinyl groups, or other double bonds are known in the art. In another example, Y is polymerizable group selected from acrylate, methacrylate, acrylamide, methacrylamide, vinylcarbonate, vinylcarbamate, vinyl ester, vinyl benzyl, vinyl halobenzyl, vinyl ether, epoxide, oxirane, hydroxyl, or isocyanate. For example, the vinyl benzyl can be styrene. For example, the vinyl halobenzyl can be fluorinated styrene.

In one aspect, n is 0. In another aspect, n is from 1-100, for example, from 1-50, 1-25, or 1-10. In another aspect, n is 0, 1, 2, 3, 4, 5, 6, 7, 8, 9, 10, 11, 12, 13, 14, 15; 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100.

In one aspect, o is 0. In another aspect, o is from 1-100, for example, from 1-50, 1-25, or 1-10. In another aspect, 0 is 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100.

In one aspect, m is 1 or 2. In one aspect, m is 2. In another aspect, o is from 1-20, for example, from 1-15, 1-10, or 1-5. In another aspect, o is from 2-20, for example, from 2-15, 2-10, or 2-5. In another aspect, m is 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30.

In one aspect, the monomer comprising fluorine can have the structure

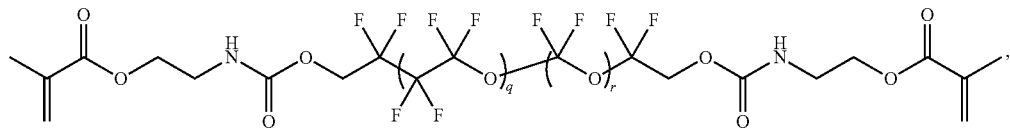

wherein q is from 5-15, and wherein r is from 2-10. For example, q can be 9 and r can be 5. In another example, q can be from 7-11 and r can be 3-7.

In one aspect, the monomer comprising fluorine can have the structure

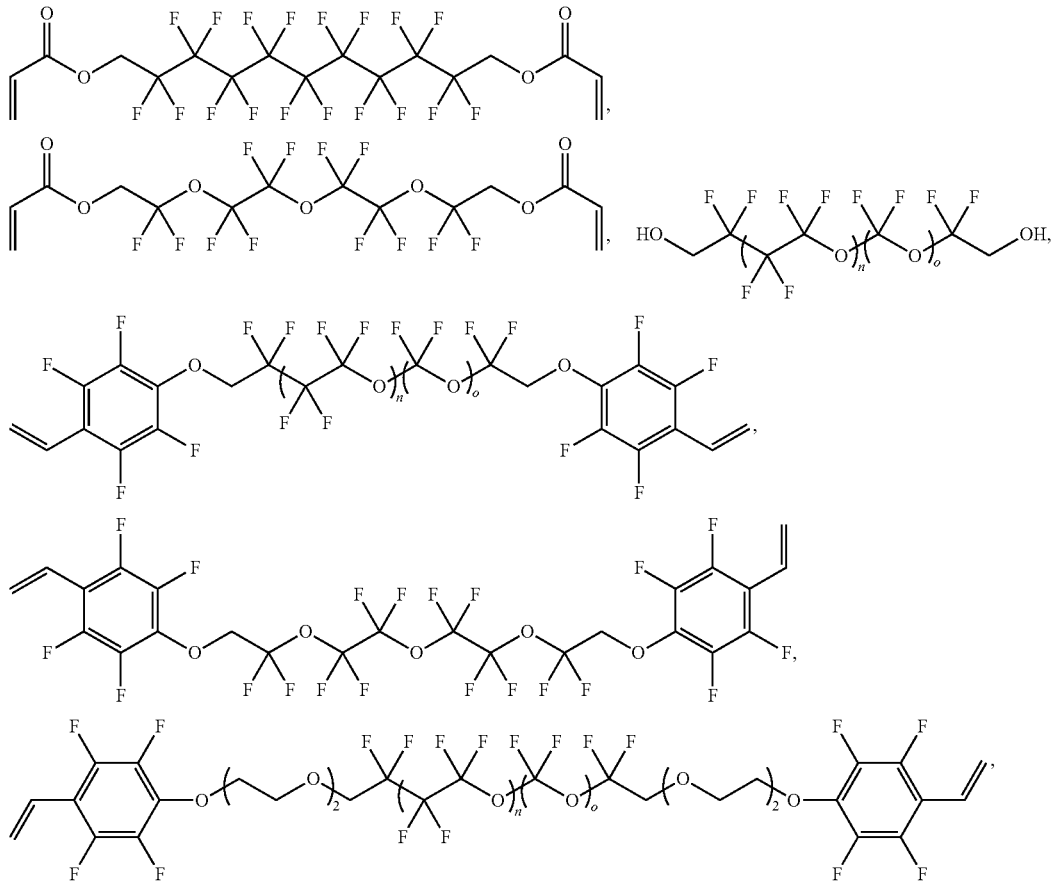

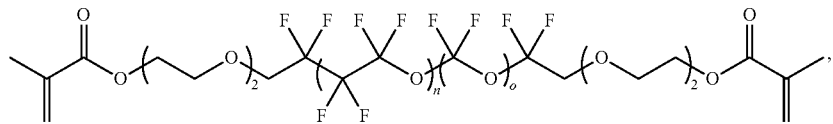

-continued

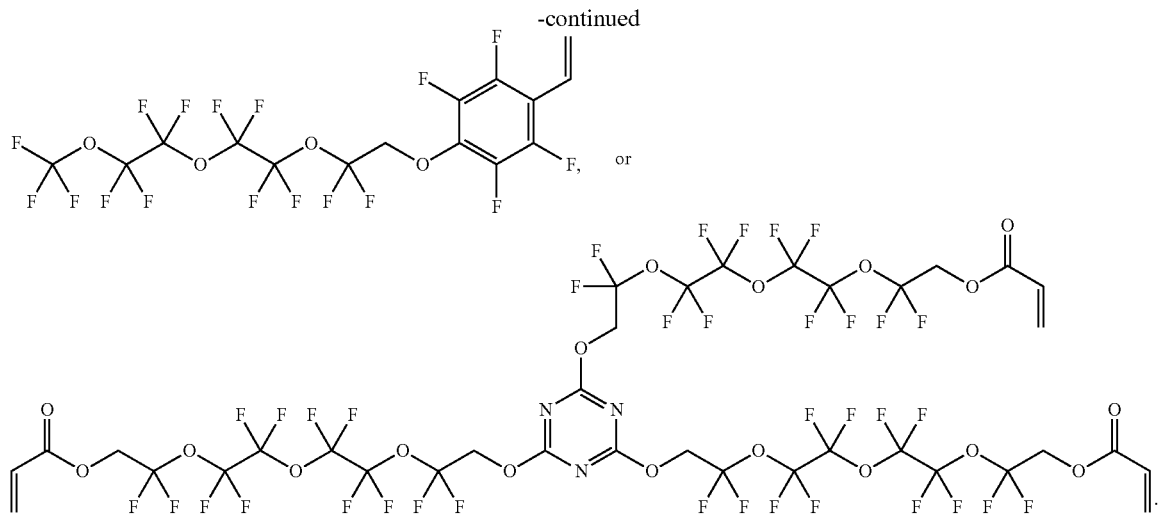

In one aspect, the monomer comprising an ion generating moiety can have the structure

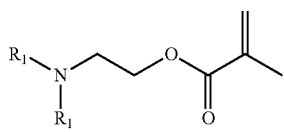

wherein each $R_1$ group independently is H or C1-C3 alkyl. For example, each $R_1$ group can independently be C1-C3 alkyl. In another example, each $R_1$ group can be C1 alkyl. In another example, one $R_1$ group can be H and the other $R_1$ group can be C1-C3 alkyl.

In one aspect, the monomer comprising fluorine can have the structure

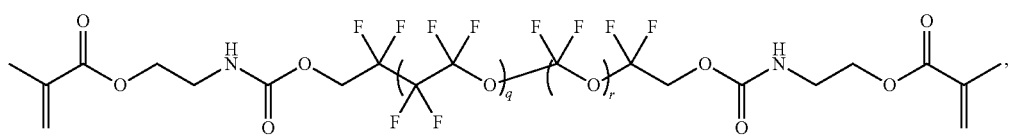

wherein q is from 5-15, and wherein r is from 2-10, and the monomer comprising an ion generating moiety can have the structure

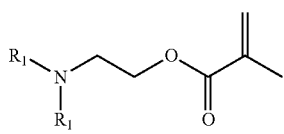

wherein each $R_1$ group independently is H or C1-C3 alkyl.

In one aspect, the monomer comprising an ion generating moiety can have the structure

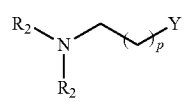

wherein each $R_2$ group independently is H, C1-C6 alkyl, C1-C6 fluoroalkyl, aryl, or fluoroaryl, wherein p is from 0-11, and wherein Y is a polymerizable group. Y is a polymerizable group as disclosed elsewhere herein. In one aspect, p can be 0. In another aspect, p can be 1-11. For example, p can be 0, 1, 2, 3, 4, 5, 6, 7, 8, 9, 10, or 11. For example, each $R_2$ group independently can be C1-C6 alkyl, C1-C6 fluoroalkyl, aryl, or fluoroaryl, such as, C1-C6 alkyl, for example, C1 alkyl. In another example, one $R_2$ group can be H and the other $R_2$ group can be C1-C6 alkyl, C1-C6 fluoroalkyl, aryl, or fluoroaryl, such as, C1-C6 alkyl, for example, C1 alkyl.

In one aspect, the monomer comprising fluorine can have the structure

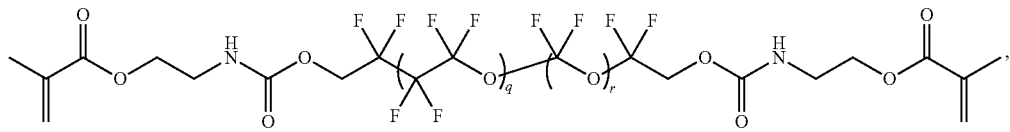

wherein q is from 5-15, and wherein r is from 2-10,
and the monomer comprising an ion generating moiety can have the structure

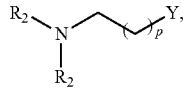

wherein each $R_2$ group independently is H, C1-C6 alkyl, C1-C6 fluoroalkyl, aryl, or fluoroaryl, wherein p is from 0-11, and wherein Y is a polymerizable group.

In one aspect, the monomer comprising an ion has the structure

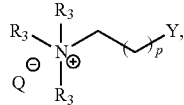

wherein each $R_3$ group independently is H, C1-C6 alkyl, C1-C6 fluoroalkyl, aryl, or fluoroaryl,
wherein p is from 0-11, wherein Y is a polymerizable group, and wherein Q is a counter ion. Y is a polymerizable group as disclosed elsewhere herein. In one aspect, p can be 0. In another aspect, p can be 1-11. For example, p can be 0, 1, 2, 3, 4, 5, 6, 7, 8, 9, 10, or 11. For example, each $R_3$ group independently can be C1-C6 alkyl, C1-C6 fluoroalkyl, aryl, or fluoroaryl, such as, C1-C6 alkyl, for example, C1 alkyl. In another example, one $R_3$ group can be H and the other two $R_3$ groups can be C1-C6 alkyl, C1-C6 fluoroalkyl, aryl, or fluoroaryl, such as, C1-C6 alkyl, for example, C1 alkyl. In another example, two $R_3$ groups can be H and the remaining $R_3$ group can be C1-C6 alkyl, C1-C6 fluoroalkyl, aryl, or fluoroaryl, such as, C1-C6 alkyl, for example, C1 alkyl.

Q can be any negatively charged counter ion as is known in the art. For example, Q can be $Cl^-$, $Br^-$, $BF_4^-$, or $SO_3^-$.

In one aspect, the monomer comprising an ion has the structure

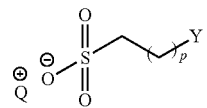

wherein p is from 0-11, wherein Y is a polymerizable group, and wherein Q is a counter ion,
Q can be any positively charged counter ion as is known in the art. For example, Q can be $K^+$ or $Na^+$.

In one aspect, the monomer comprising fluorine can have the structure

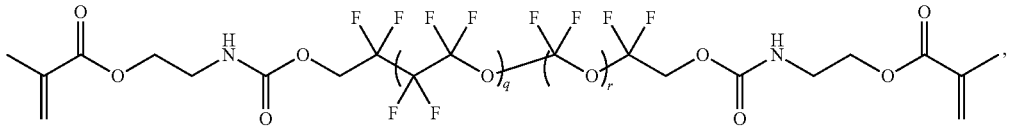

wherein q is from 5-15, and wherein r is from 2-10,
and the monomer comprising an ion has the structure

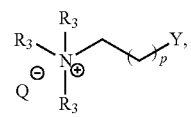

wherein each $R_3$ group independently is H, C1-C6 alkyl, C1-C6 fluoroalkyl, aryl, or fluoroaryl, wherein p is from 0-11, wherein Y is a polymerizable group, and wherein Q is a counter ion.

In one aspect, the monomer comprising an ion has the structure

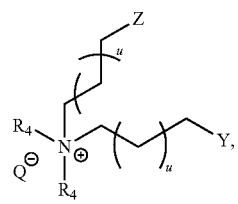

wherein each $R_4$ group independently is H, C1-C6 alkyl, C1-C6 fluoroalkyl, aryl, or fluoroaryl,
wherein each u is independently from 0-10, wherein Y is a polymerizable group, wherein Z is an anionic group or a polymerizable group, and wherein Q is a counter ion. Y is a polymerizable group as disclosed elsewhere herein. In one aspect, each u can be 0. In another aspect, each u can independently be can be 1-10. For example, each u can independently be 0, 1, 2, 3, 4, 5, 6, 7, 8, 9, or 10. When Z is defined as a polymerizable group, it can be defined the as the polymerizable group Y disclosed herein. When Z is an anionic group it can be, for example, carboxylate or sulfonate. For example, each $R_4$ group independently can be C1-C6 alkyl, C1-C6 fluoroalkyl, aryl, or fluoroaryl, such as, C1-C6 alkyl, for example, C1 alkyl. In another example, one $R_4$ group can be H and the other $R_4$ group can be C1-C6 alkyl, C1-C6 fluoroalkyl, aryl, or fluoroaryl, such as, C1-C6 alkyl, for example, C1 alkyl.

In one aspect, the fluorinated ionic polymer network is in the form of a particle. The particle can have a mean average diameter from 5 nm to 10 cm, for example, from 100 nm to 10 cm, from 1 μm to 10 cm, from 10 μm to 10 cm, from 100 μm to 10 cm, 1 cm to 10 cm, or from 5 cm to 10 cm.

In one aspect, the particle can have a size that is larger than a predetermined size, which can be based on the size of pores in a filter. For example, the filter can have a pore size of 1 μm. Thus, the particles should have a size of more than 1 μm so they can be collected by the filter.

In one aspect, the fluorinated ionic polymer network can be a membrane or part of a membrane. For example, the fluorinated ionic polymer network can be particles that are filled into a cartridge, a paced resin bed, a column, a water filtration device, or a sampling device.

The method disclosed herein can be performed in any body of water. For example, the body of water can be a natural body of water, such as a lake, pond, stream, ocean, or a manmade body of water, such as a treatment plant, pool, or dam.

2. Polymers

Also disclosed herein are polymers, such as co-polymers. The co-polymers disclosed herein are useful in the methods disclosed herein. The co-polymers disclosed herein can be made via known polymerization methods, such a free-radical polymerization using an initiator, such as azoisobutylnitrile (AIBN).

Also disclosed here is a co-polymer made from:

a) a monomer comprising an ion generating moiety having the structure

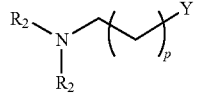

wherein each $R_2$ group independently is H, C1-C6 alkyl, C1-C6 fluoroalkyl, aryl, or fluoroaryl,
wherein p is from 0-11, and
wherein Y is a polymerizable group, or
a monomer comprising an ion having the structure

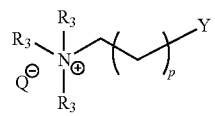

wherein each $R_3$ group independently is H, C1-C6 alkyl, C1-C6 fluoroalkyl, aryl, or fluoroaryl,
wherein p is from 0-11,
wherein Y is a polymerizable group, and
wherein Q is a counter ion, or a monomer comprising an ion having the structure

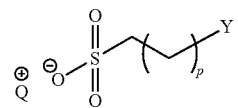

wherein p is from 0-11, wherein Y is a polymerizable group, and wherein Q is a counter ion, or
a monomer comprising an ion having the structure

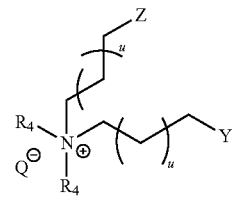

wherein each $R_4$ group independently is H, C1-C6 alkyl, C1-C6 fluoroalkyl, aryl, or fluoroaryl,
wherein each u is independently from 0-10,
wherein Y is a polymerizable group,
wherein Z is an anionic group or a polymerizable group, and
wherein Q is a counter ion, and b) a monomer comprising a fluorine having the structure

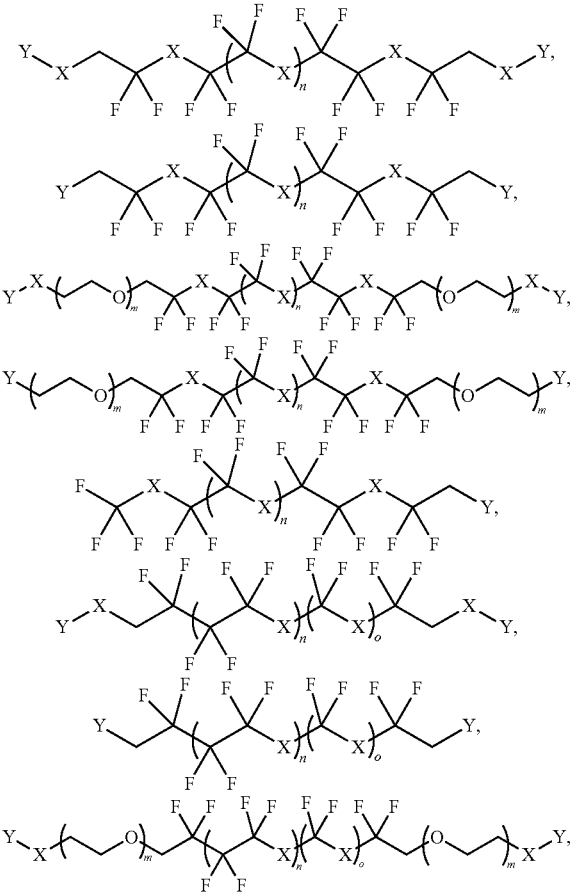

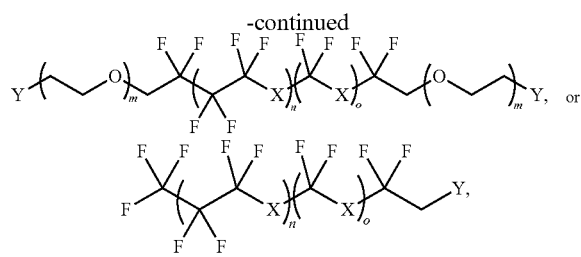

wherein each X is individually $CF_2$ or O,
wherein each Y is polymerizable group,
wherein n is from 0-100,
wherein o is from 0-100, and
wherein each m is individually from 1-30.

In one aspect, the monomer comprising a fluorine has the structure

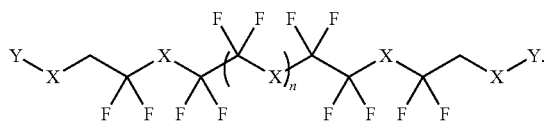

In one aspect, the monomer comprising a fluorine has the structure

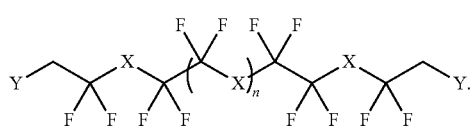

In one aspect, the monomer comprising a fluorine has the structure

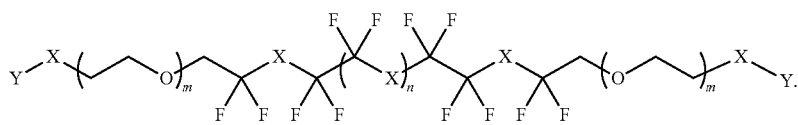

In one aspect, the monomer comprising a fluorine has the structure

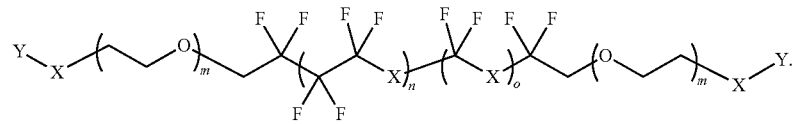

In one aspect, the monomer comprising a fluorine has the structure

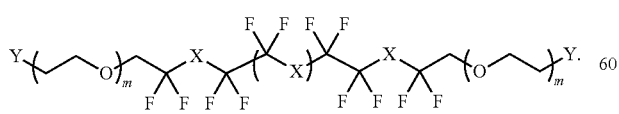

In one aspect, the monomer comprising a fluorine has the structure

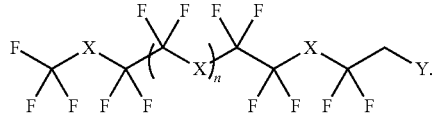

In one aspect, the monomer comprising a fluorine has the structure

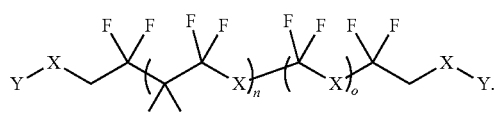

In one aspect, the monomer comprising a fluorine has the structure

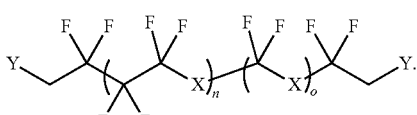

In one aspect, the monomer comprising a fluorine has the structure

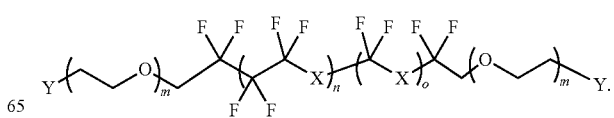

In one aspect, the monomer comprising a fluorine has the structure

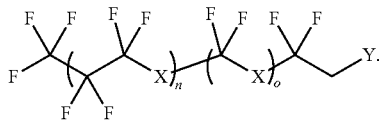

In one aspect, x is $CF_2$. In another aspect, x is O. In yet another aspect, x is S. In yet another aspect, x is N—$R_5$, wherein $R_5$ is H, alkyl, or aryl. For example, $R_5$ can be H. In another example, $R_5$ can be alkyl, such as C1-C6 alkyl, for example C1-C3 alkyl. In another example, $R_5$ can be aryl, for example C6 aryl.

In one aspect, Y is polymerizable group comprising a double bond. In another example, Y is polymerizable group comprising a vinyl group. Polymerizable groups containing vinyl groups, or other double bonds are known in the art. In another example, Y is polymerizable group selected from acrylate, methacrylate, acrylamide, methacrylamide, vinylcarbonate, vinylcarbamate, vinyl ester, vinyl benzyl, vinyl halobenzyl, vinyl ether, epoxide, oxirane, hydroxyl, or isocyanate.

In one aspect, n is 0. In another aspect, n is from 1-100, for example, from 1-50, 1-25, or 1-10. In another aspect, n is 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100.

In one aspect, o is 0. In another aspect, o is from 1-100, for example, from 1-50, 1-25, or 1-10. In another aspect, o is 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100.

In one aspect, m is 1 or 2. In one aspect, m is 2. In another aspect, o is from 1-20, for example, from 1-15, 1-10, or 1-5. In another aspect, o is from 2-20, for example, from 2-15, 2-10, or 2-5. In another aspect, m is 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30.

In one aspect, the monomer comprising fluorine can have the structure

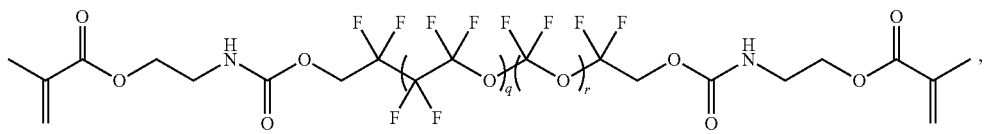

wherein q is from 5-15, and wherein r is from 2-10. For example, q can be 9 and r can be 5. For example, q can be from 7-11 and r can be from 3-7.

In one aspect, the monomer comprising fluorine can have the structure

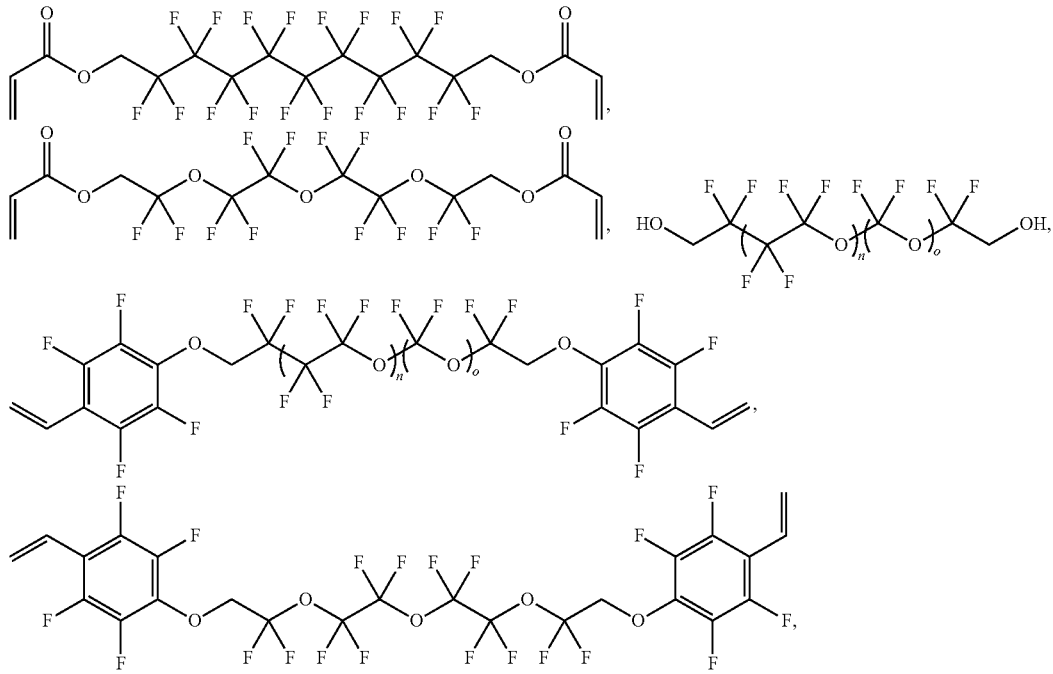

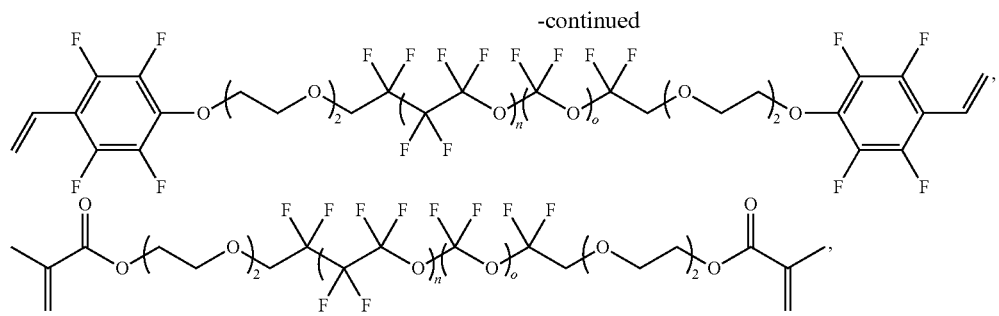

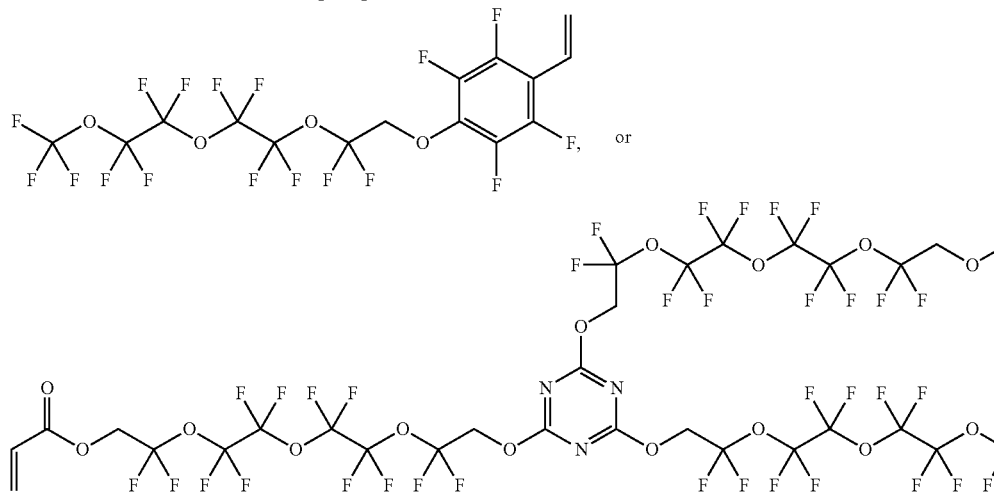

In one aspect, the monomer comprising an ion generating moiety can have the structure

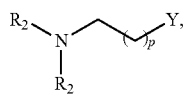

wherein each $R_2$ group independently is H, C1-C6 alkyl, C1-C6 fluoroalkyl, aryl, or fluoroaryl,
wherein p is from 0-11, and wherein Y is a polymerizable group. Y is a polymerizable group as disclosed elsewhere herein. In one aspect, p can be 0. In another aspect, p can be 1-11. For example, p can be 0, 1, 2, 3, 4, 5, 6, 7, 8, 9, 10, or 11. For example, each $R_2$ group independently can be C1-C6 alkyl, C1-C6 fluoroalkyl, aryl, or fluoroaryl, such as, C1-C6 alkyl, for example, C1 alkyl. In another example, one $R_2$ group can be H and the other $R_2$ group can be C1-C6 alkyl, C1-C6 fluoroalkyl, aryl, or fluoroaryl, such as, C1-C6 alkyl, for example, C1 alkyl.

In one aspect, the monomer comprising an ion has the structure

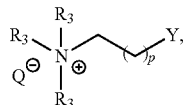

wherein each $R_3$ group independently is H, C1-C6 alkyl, C1-C6 fluoroalkyl, aryl, or fluoroaryl,
wherein p is from 0-11, wherein Y is a polymerizable group, and wherein Q is a counter ion. Y is a polymerizable group as disclosed elsewhere herein. In one aspect, p can be 0. In another aspect, p can be 1-11. For example, p can be 0, 1, 2, 3, 4, 5, 6, 7, 8, 9, 10, or 11. For example, each $R_3$ group independently can be C1-C6 alkyl, C1-C6 fluoroalkyl, aryl, or fluoroaryl, such as, C1-C6 alkyl, for example, C1 alkyl. In another example, one $R_3$ group can be H and the other two $R_3$ groups can be C1-C6 alkyl, C1-C6 fluoroalkyl, aryl, or fluoroaryl, such as, C1-C6 alkyl, for example, C1 alkyl. In another example, two $R_3$ groups can be H and the remaining $R_3$ group can be C1-C6 alkyl, C1-C6 fluoroalkyl, aryl, or fluoroaryl, such as, C1-C6 alkyl, for example, C1 alkyl.

In one aspect, the monomer comprising an ion has the structure

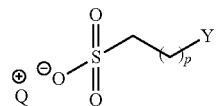

wherein p is from 0-11, wherein Y is a polymerizable group, and wherein Q is a counter ion. Y is a polymerizable group as disclosed elsewhere herein. In one aspect, p can be 0. In another aspect, p can be 1-11. For example, p can be 0, 1, 2, 3, 4, 5, 6, 7, 8, 9, 10, or 11.

In one aspect, the monomer comprising an ion has the structure

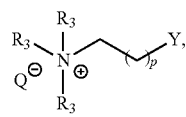

wherein each $R_3$ group independently is H, C1-C6 alkyl, C1-C6 fluoroalkyl, aryl, or fluoroaryl, wherein p is from 0-11, wherein Y is a polymerizable group, and wherein Q is a counter ion. Y is a polymerizable group as disclosed elsewhere herein. In one aspect, p can be 0. In another aspect, p can be 1-11. For example, p can be 0, 1, 2, 3, 4, 5, 6, 7, 8, 9, 10, or 11. For example, each $R_3$ group independently can be C1-C6 alkyl, C1-C6 fluoroalkyl, aryl, or fluoroaryl, such as, C1-C6 alkyl, for example, C1 alkyl. In another example, one $R_3$ group can be H and the other two $R_3$ groups can be C1-C6 alkyl, C1-C6 fluoroalkyl, aryl, or fluoroaryl, such as, C1-C6 alkyl, for example, C1 alkyl. In another example, two $R_3$ groups can be H and the remaining $R_3$ group can be C1-C6 alkyl, C1-C6 fluoroalkyl, aryl, or fluoroaryl, such as, C1-C6 alkyl, for example, C1 alkyl.

In one aspect, the monomer comprising an ion has the structure

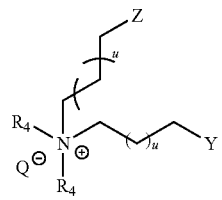

wherein each $R_4$ group independently is H, C1-C6 alkyl, C1-C6 fluoroalkyl, aryl, or fluoroaryl, wherein each u is independently from 0-10, wherein Y is a polymerizable group, wherein Z is an anionic group or a polymerizable group, and wherein Q is a counter ion. Y is a polymerizable group as disclosed elsewhere herein. In one aspect, each u can be 0. In another aspect, each u can independently be can be 1-10. For example, each u can independently be 0, 1, 2, 3, 4, 5, 6, 7, 8, 9, or 10. When Z is defined as a polymerizable group, it can be defined the as the polymerizable group Y disclosed herein. When Z is an anionic group it can be, for example, carboxylate or sulfonate. For example, each $R_4$ group independently can be C1-C6 alkyl, C1-C6 fluoroalkyl, aryl, or fluoroaryl, such as, C1-C6 alkyl, for example, C1 alkyl. In another example, one $R_4$ group can be H and the other $R_4$ group can be C1-C6 alkyl, C1-C6 fluoroalkyl, aryl, or fluoroaryl, such as, C1-C6 alkyl, for example, C1 alkyl.

In one aspect, if the co-polymer comprises the monomer comprising an ion generating moiety, then the monomer comprising an ion generating moiety is ionized.

In one aspect, the co-polymer is in the form of a particle. The particle can have a mean average diameter from 5 nm to 10 cm, for example, from 100 nm to 10 cm, from 1 μm to 10 cm, from 10 m to 10 cm, from 100 μm to 10 cm, 1 cm to 10 cm, or from 5 cm to 10 cm.

In one aspect, the particle can have a size that is larger than a predetermined size, which can be based on the size of pores in a filter. For example, the filter can have a pore size of 1 μm. Thus, the particles should have a size of more than 1 μm so they can be collected by the filter.

In one aspect, the fluorinated ionic polymer network can be a membrane or part of a membrane. For example, the fluorinated ionic polymer network can be particles that are filled into a cartridge, a paced resin bed, a column, a water filtration device, or a sampling device.

A membrane comprising an fluorinated ionic polymer network disclosed herein.

C. Experimental

The following examples are put forth so as to provide those of ordinary skill in the art with a complete disclosure and description of how the compounds, compositions, articles, devices and/or methods claimed herein are made and evaluated, and are intended to be purely exemplary of the invention and are not intended to limit the scope of what the inventors regard as their invention. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

1. Materials and Instrumentation

Materials: All materials purchased from commercial source was used as received without further purification unless otherwise mentioned. Perfluoropolyether Fluorolink® MD700 (Mwt: 1.8-2.0 kg·mol$^{-1}$) was purchased from Solvay Solexis. 2-(dimethylamino)ethyl methacrylate, Poly(ethylene glycol) dimethacrylate (average Mn 750), azobisisobutyronitrile (AIBN), humic acid and perfluorooctanoic acid (PFOA) was purchased from Sigma-Aldrich. Trifluoroethanol was purchased Synquest labs. Perfluorohexanoic acid (PFHxA) and GenX were purchased from TCI and Matrix respectively.

Instrumentation: LCMS: Water samples were stored under refrigeration until analysis. A 196 μL aliquot of sample and 4 μL of stable isotope-labeled analogues (Wellington Labs, Guelph, CA, product numbers MPFAC-C-ES and M3HFPO-DA) were transferred to polypropylene autosampler vials and closed with caps fitted with silicone septa. No other processing was done as per a direct injection method by Sun, M. et al., Environ. Sci. Technol. Lett. 2016, 3, 415-419.

Analysis of target compounds was performed using an Accela HPLC system coupled to a TSQ-Quantum Ultra triple-quadrupole mass analyzer (Thermo Scientific, San Jose, CA) operated in negative ion mode. Samples were chromatographed on a 3.0×50 mm Poroshell C18 2.7 μm column (Agilent Technologies, Santa Clara, CA) with gradient elution at a flow rate of 350 μL per min. Binary mobile phase consisted of 95:5:water:methanol containing 2 mM ammonium acetate (A) and 5:95:water:methanol containing 2 mM ammonium acetate (B). Composition started at 25% B, was held for 0.5 min., increased linearly to 90% B over 2 min., was held at 90% B for 1.5 min., decreased linearly to 25% B over 0.1 min., and held at 25% B for 0.9 min for column equilibration. Mass spectrometer parameters were as follows: spray voltage of 3000 V, vaporizer temperature of 150° C., sheath gas flow rate 40, auxiliary gas flow rate 20, capillary temperature of 225° C., argon collision gas pressure of 1.0 mTorr, 0.05 sec per scan, quadrupole 1 resolution of 0.5 amu, quadrupole 3 resolution of 0.7 amu and collision energy 10 eV. Mass transitions and other compound-specific parameters are listed in Table 1. The limit of detection was 2 μg per 100 μL (20 μg/mL) injection for each analyte. Linear or quadratic calibration curves using the analyte to internal standard ratio were used to calculate analyte amounts. Calibration points were 2, 10, 50, 200, and 1000 µg analyte versus 50 µg internal standard for PFCAs and PFASs.

Thermal gravimetric analysis (TGA) was performed on a TA Instruments TGA (Discovery Series) using 5-8 mg of the sample. The samples were heated to 25-600° C. at a temperature ramp rate of 10° C./min. Infrared (IR) spectra were obtained using PerkinElmer Frontier FT-IR spectrometer.

Deionized water used in this study is a type 1, 18.2 megohm-cm water obtained from Labconco—waterpro PS series. This water was amended with sodium chloride and humic acid if necessary.

Centrifugation was performed using a benchtop centrifuge—Mini mouse II by Denville.

2. Batch Absorption

The batch adsorption studies of mixtures of PFAS (PFOA, PFHxA and GenX) was performed in a 1 µL HDPE bottle equipped with a magnetic stir bar. The mixture was stirred on a stir plate at room temperature and at 700 revolution per minute (rpm).

High Concentration (50 µg/L): To a 1 µL deionized water added sodium chloride (200 mg) and humic acid (20 mg) and stirred overnight. To this mixture added vacuum dried polymer adsorbent (fluorinated ionic polymer network) (10 mg $L^{-1}$) and stirred at room temperature for 3 h with occasional sonication to disperse the adsorbent. A stock solution of PFAS was spiked to the mixture to create an initial concentration of 50 µg $L^{-1}$ of each PFAS. This mixture was stirred for 21 h after which an aliquot of about 10 mL was withdrawn and filtered through either 0.2 m PTFE or 0.45 µm cellulose acetate filter. The first 5 mL was drained to avoid any electrostatic effect from the filter and the remaining 5 mL was collected for LCMS analysis. Control experiments to account for PFAS losses during handling were performed under identical condition in the absence of adsorbent. This batch experiment was performed only once.

Low Concentration (1 µg/L): The batch adsorption studies of PFAS under environmentally relevant concentration described below (1 g $L^{-1}$) was performed under identical condition as detailed above except that the PFAS was spiked to create an initial concentration of 1 g $L^{-1}$ of each PFAS. This set of experiments were performed in triplicates.

Control adsorbents used were granular activated carbon (GAC: Filtrasorb 400), powdered activated carbon (PAC: PicaHydro MP23) and ion-exchange resin (IX: PFA694E).

The efficiency of PFAS removal by adsorbents discussed herein was determined by the following equation:

$$\% \text{ PFAS removal} = \frac{C_0 - C_t}{C_0} \times 100$$

$C_0$ $(\mu g\ L^{-1})$ = Initial concentration of PFAS $C_t$ $(\mu g\ L^{-1})$ = Residual concentration of PFAS The amount of PFAS bound to the polymer sorbent is given by the following equation:

$$q_t = \frac{C_0 - C_t}{C_A}$$

$q_t$ (mg $g^{-1}$) = Amount of PFAS adsorbed on the solid phase at time $t(h)$ $C_t$ $(\mu g\ L^{-1})$ = Concentration of PFAS in liquid phase at time $t(h)$ $C_o$ $(\mu g\ L^{-1})$ = Average concentration of PFAS in control experiments $C_A$ (mg $L^{-1}$) = Concentration of adsorbent 3. Adsorption Kinetics For the adsorption kinetic experiments disclosed herein, the following conditions were used.

High concentration (200 µg/L): The adsorption kinetic experiments were performed in 125 mL polypropylene bottle equipped with a magnetic stir bar. The experiments were performed at room temperature on a multi-position stirrer at 500 rpm. The adsorbent dose was set at 10 mg/L with total operating volume of 100 mL. The fluorinated ionic polymer network and water mixture was stirred for 3 h with occasional sonication to disperse the adsorbent before being spiked with GenX stock to create an initial concentration of 200 µg/L. About 1 mL aliquot was taken at each predetermined time intervals (0.5, 1, 5, 10, 30, 60, mins and 21, 48 and 72 h). The aliquots were centrifuged for 15 minutes and the supernatant was analyzed by LCMS to determine the residual GenX concentration. Control experiments to account for GenX losses during handling were performed under identical condition in the absence of adsorbent. This batch kinetics experiment was performed in triplicates.

Low concentration (1 µg/L): About 5 mg of fluorinated ionic polymer network was taken in an 8 mL vial, followed by addition of DI water to create a concentration of 1 mg/mL. The mixture was subjected to series of vortex and sonication to completely disperse fluorinated ionic polymer network. 1 mL of this mixture was taken while under constant mixing and added to 99 mL of water in a polypropylene bottle (125 mL) equipped with a magnetic stir bar. The mixture was stirred at 500 rpm for 3 h before being spiked with GenX stock to create an initial concentration of 1 µg/L. About 1 mL aliquot was taken at each predetermined time intervals (0.5, 1, 3, 5, 10, 20, 30, 60, 120, 240 mins and 21, 48 and 72 h). The aliquots were centrifuged for 15 minutes and the supernatant was analyzed by LCMS to determine the residual GenX concentration. Control experiments to account for GenX losses during handling were performed under identical condition in the absence of adsorbent. This batch kinetics experiment was performed in triplicates.

The kinetics of adsorption can be described with Ho and McKay's linearized form of pseudo-second-order adsorption model given by following equation (Ho, Y. et al., *Process Biochem.* 1999, 34, 451-465):

$$\frac{t}{q_t} = \frac{t}{q_e} + \frac{1}{k_{obs}q_e^2}$$

$q_e$ (mg $g^{-1}$) = Amount of GenX adsorbed on the solid phase at equilibrium $k_{obs}$ (g $mg^{-1}\ h^{-1}$) = Rate of adsorption $q_t$ (mg $g^{-1}$) = Amount of GenX adsorbed on the solid phase at time $t(h)$ 4. Binding Isotherm For the binding isotherm experiments disclosed herein, the following conditions were used.

The batch isotherm studies were performed in 125 mL polypropylene bottles (100 mL operating volume) containing magnetic stir bar on a multi-position stirrer at 23-25° C. at 500 rpm. The deionized water containing fluorinated ionic polymer network adsorbent (100 mg/L) was stirred for 3 h before the GenX addition. A stock solution of GenX was spiked to create initial concentrations of 0.2, 1, 5, 10, 20, 30 and 50 mg/L. The suspension was stirred for 21 h to reach equilibrium and an aliquot was taken in a centrifuge tube. The aliquots were centrifuged for 15 minutes and the supernatant from the top was taken for LCMS analysis. High concentration samples were serial diluted (5-10 mg/L diluted 20× and 20-50 mg diluted 100×) before LCMS analysis. Control experiments in the absence of adsorbent were performed under identical conditions to account for handling losses. All the batch experiments were carried out in triplicates.

Langmuir adsorption and Freundlich isotherm fits were generated by Non-linear $$q_e = \frac{q_m K_L C_e}{1 + C_e q_m K_L}$$

$q_e$ (mg g$^{-1}$) =

Amount of PFAS adsorbed on the solid phase at equilibrium $q_m$ (mg$^{-1}$ g) = Maximum adsorption capacity of adsorbent at equilibrium $C_e$ (mg$^{-1}$ L$^{-1}$) = Residual PFAS concentration at equilibrium $K_L$ (mg$^{-1}$ L$^{-1}$) = Equilibrium constant Freundlich adsorption isotherm:

$$q_e = K_F C_e^{\frac{1}{n}}$$

$q_e$ (mg g$^{-1}$) =

Amount of PFAS adsorbed on the solid phase at equilibrium $C_e$ (mg$^{-1}$ L$^{-1}$) = Residual PFAS concentration at equilibrium $K_F$ (mg g$^{-1}$)(L mg$^{-1}$)$^{1/n}$ = Freundlich constant.

n is the intensity of adsorption

A preliminary fit was generated using linearized equations of Langmuir (1/$q_e$ vs 1/$C_e$) and Freundlich (ln $q_e$ vs ln $C_e$) adsorption isotherm and the obtained values were used as a starting point for non-linear least square regression analysis. Table 1 shows the Langmuir and Freundlich parameters derived from linearized plots of the GenX binding isotherm. In Table 1 IF-20 and IF-30 represents networks with fluorolink (80% and 70%) and 2-(dimethylamino)ethyl methacrylate (20% and 30%), respectively.

TABLE 1

| Fluorinated ionic polymer network | Langmuir Fit | | | Freundlich Fit | | |
|---|---|---|---|---|---|---|
| | $K_L$ (M$^{-1}$) | Qm (mg/g) | $R^2$ | $K_F$ (mg/g)(L/mg)$^{1/n}$ | n | $R^2$ |
| IF-20 | 5.9 × 10$^6$ | 278 | 0.99 | 141 | 2.2 | 0.93 |
| IF-30 | 1.5 × 10$^7$ | 217 | 0.99 | 152 | 2.2 | 0.95 |

5. Natural Water Experiments

For the natural water experiments disclosed herein, the following conditions were used.

The adsorption kinetic experiments were performed in 500 mL polypropylene bottles equipped with a magnetic stir bar. The experiments were performed at room temperature on magnetic stirrers. The adsorbent dose was set at 100 mg/L with a total operating volume of 400 mL. The fluorinated ionic polymer network was soaked in 5 ml of water for 3 days with occasional sonication do disperse the adsorbent before being adding to the 1 µg/L PFAS spiked water. About 10 mL aliquot was taken at each predetermined time intervals (0, 30, 60 and 120 mins). The aliquots were filtered through pre-washed 0.45 µm glass fiber syringe filter and the filtered solution was analyzed by LCMS to determine the residual PFAS concentration. Two control experiments to account for PFAS losses and PFAS contaminations during handling were performed under an identical condition in the absence of adsorbent and Deionized water. This batch kinetics experiment was performed in duplicate.

6. Adsorption and Regeneration Experiments

For the adsorption and regeneration experiments disclosed herein, the following conditions were used.

Adsorption experiment: Fluorinated ionic polymer network IF-20 (20 mg) was suspended in deionized water (5 mL) followed by series of sonication and vortexing for 5 mins to disperse the adsorbent. The resulting suspension was passed through 20 mL syringe fitted with 0.45 m PTFE filter (25 mm), additional water was used if necessary. A solution of GenX (10 mg L$^{-1}$, 20 mL) was passed through the filter over 2 mins and the resultant filtrate was collected in a polypropylene tube. The change in GenX concentration in the filtrate was measured by LC-MS. The PTFE filter was washed by passing through deionized water (20 mL) to remove any trace of GenX solution left over and the residual deionized water was removed by vacuum suction.

Desorption experiment: The PTFE filter containing GenX was extracted by passing through a methanolic solution appended with 400 mM ammonium acetate (20 mL) over 2 minutes. The concentration of extracted GenX was analyzed by LC-MS. The PTFE filter was washed by passing through deionized water (20 mL) to remove any trace of methanolic solution left over and the residual deionized water was removed by vacuum suction.

The adsorption-desorption cycle was extended to 5 cycles to demonstrate the recyclability of the fluorinated ionic polymer network without the loss of efficiency.

7. Synthesis

An illustrative procedure for the synthesis for a fluorinated ionic polymer network with fluorolink (80%) and 2-(dimethylamino)ethyl methacrylate (20%) is provided below. To a 20 mL scintillation vial with green top cap equipped with magnetic stir bar added perfluoropolyether Fluorolink MD700 (1.6 g, 80 wt %), 2-(dimethylamino) ethyl methacrylate (0.4 g, 20 wt %), azobisisobutyronitrile (20 mg, 1 wt %) and trifluoroethanol (2.0 g, 1×). The vial was closed and bubbled with nitrogen for 5 minutes and heated in an aluminum block at 70° C. for 5 h stirring at 200-300 rpm. Within 15 mins, fluorinated ionic polymer network particles were observed and within 1 h the entire mixture was gelled. After the reaction, the mixture was cooled to room temperature and the fluorinated ionic polymer network was hand crushed to fine powder. To this powder, additional trifluoroethanol (10 mL) and iodomethane (2 mL) was added and the mixture was stirred at room temperature for 24 h. The content of the vial was transferred to teabag and ethanol was used to transfer if needed. The fluorinated ionic polymer network was washed with ethanol using Soxhlet extraction set up for 24 h. Finally, the fluorinated ionic polymer network was dried under vacuum oven at 50° C. for 24 h, then passed through 125 µm and 75 µm sieves to collect particles in that range. The fluorinated ionic polymer network was obtained as a pale-yellow powder in 2.2 g yield.

To obtain the fluorinated ionic polymer network in the form of a tertiary amine, the methylation step was not performed. Instead, after crushing, the fluorinated ionic polymer network was directly packed in teabag and purified using Soxhlet apparatus.

Other formulations of fluorinated ionic polymer networks containing varying amount of amine/ammonium derivatives were prepared by adding appropriate amount of amine and Fluorolink MD700 using the procedure above. For instance, to make a fluorinated ionic polymer network with fluorolink (70%) and 2-(dimethylamino)ethyl methacrylate (30%), 1.4 g of Fluorolink MD 700 and 0.6 g of 2-(dimethylamino) ethyl methacrylate (0.4 g, 30 wt %) was used (yield: 2.3 g).

Figure 5:
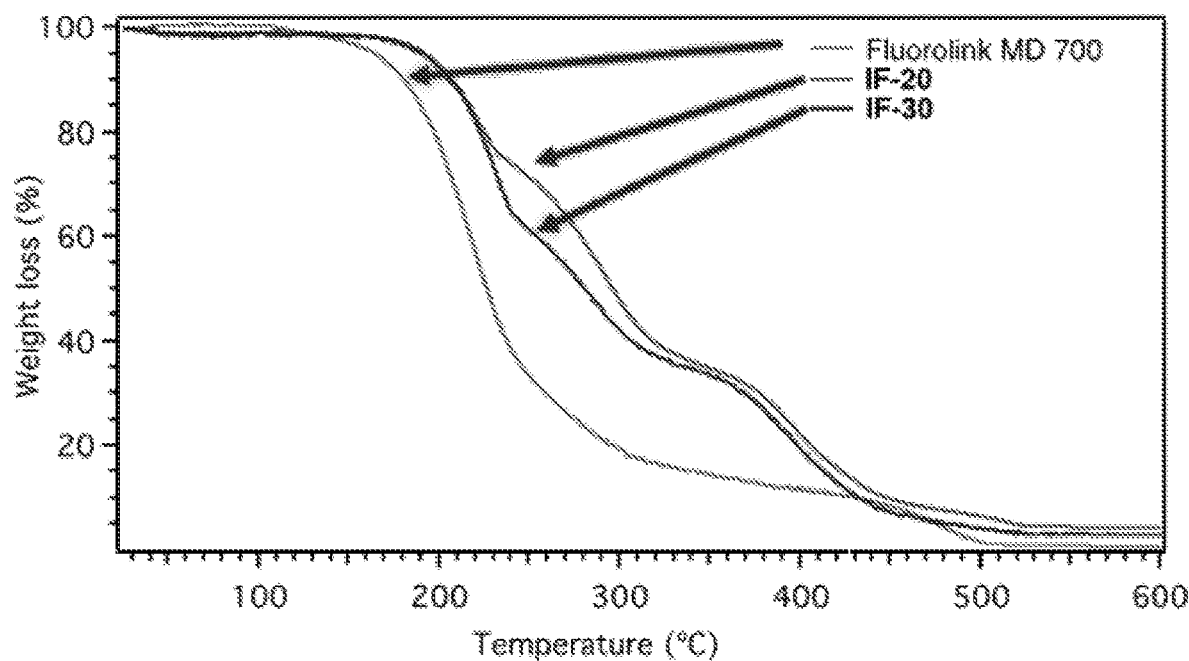
FIG. 5 shows a thermogravimetric analysis (TGA) of IF-20 and IF-30 (IF-20=a fluorinated ionic polymer network with fluorolink (80%) and 2-(dimethylamino)ethyl methacrylate (20%); IF-30=a fluorinated ionic polymer network with fluorolink (70%) and 2-(dimethylamino)ethyl methacrylate (30%))
Figure 6:
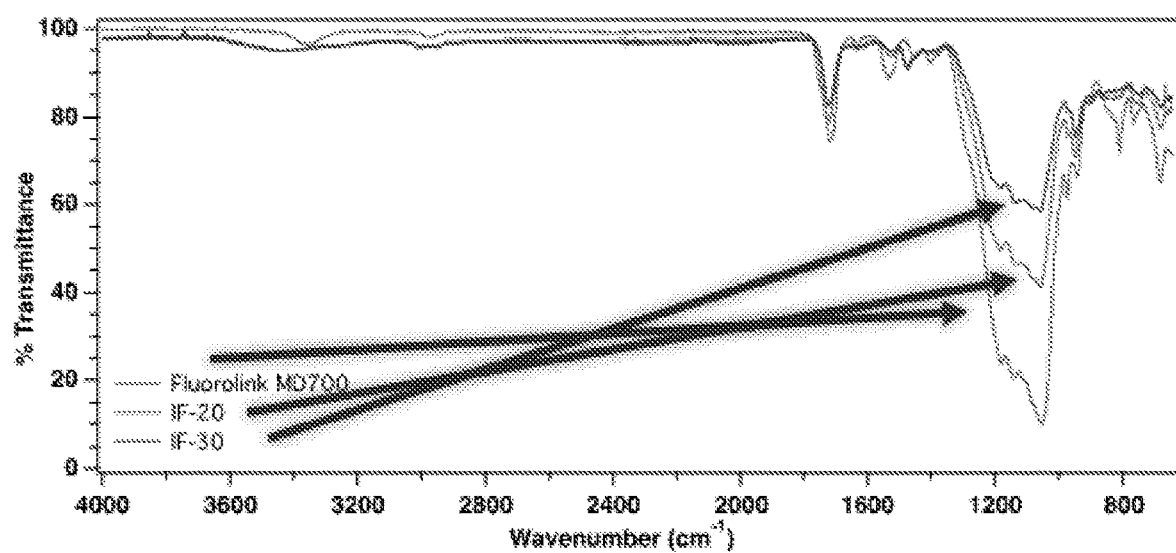
FIG. 6 shows a Fourier transform-infrared (FTIR) spectra of IF-20 and IF-30.

Synthesis of control PEG gel: PEG gels were obtained using the same procedure as mentioned above. The fluorolink MD 700 was replaced by poly(ethylene glycol) dimethacrylate (average Mn 750). This particular molecular weight was chosen to mimic the number of atoms in the backbone between the dimethacrylate functionality of fluorolink. FIG. 5 shows a TGA of IF-20 and IF-30 (IF-20=a fluorinated ionic polymer network with fluorolink (80%) and 2-(dimethylamino)ethyl methacrylate (20%); IF-30=a fluorinated ionic polymer network with fluorolink (70%) and 2-(dimethylamino)ethyl methacrylate (30%)) FIG. 6 shows a Fourier transform-infrared (FTIR) spectra of IF-20 and IF-30.

8. Results and Discussion

Perfluoropolyethers (PFPEs) were used as the fluorophilic matrix material in the experiments described herein (Bell, G. A.; Howell, *J. Synthetics, Mineral Oils, and Bio-Based Lubricants: Chemistry and Technology*; Rudnick, L. R., Ed.; CRC PRess: Boca Raton, FL, 2005; pp 157-174). PFPEs are amorphous, low molecular weight perfluorinated oligomers that are synthesized from the gas phase without the use of perfluorinated surfactants (U.S. Pat. No. 6,753,301).

The synthesis of an exemplary fluorinated ionic polymer network was achieved through a thermally-initiated radical copolymerization initiated by azobisisobutyronitrile of a commercially available PFPE with methacrylate chain-end functionality (Fluorolink©MD 700) and an amine-containing monomer (2-dimethylaminoethyl methacrylate, DMAEMA) (Scheme 1).

provided a granular formulation with particle size between 75-125 microns for evaluation. A portion of each formulation was subsequently treated with methyl iodide to access materials with quaternary ammonium groups that act as permanent charged species of the exemplary fluorinated ionic polymer network.

This approach provides two exemplary fluorinated ionic polymer network formulations for analysis from a single polymerization of commercially available components. A library of materials was additionally prepared to act as negative controls in our structure-property studies. First, a PFPE elastomer with no electrostatic component (no DMAEMA) was made. Second, non-fluorous ionic networks with charged groups but without a fluorous component were synthesized through the radical copolymerization of polyethylene glycol dimethacrylate (PEG-DMA, Mn=750 g/mol) and DMAEMA. This particular PEG-DMA was chosen to mimic a similar degree of polymerization between crosslinks as Fluorolink® MD 700.

Figure 1B:
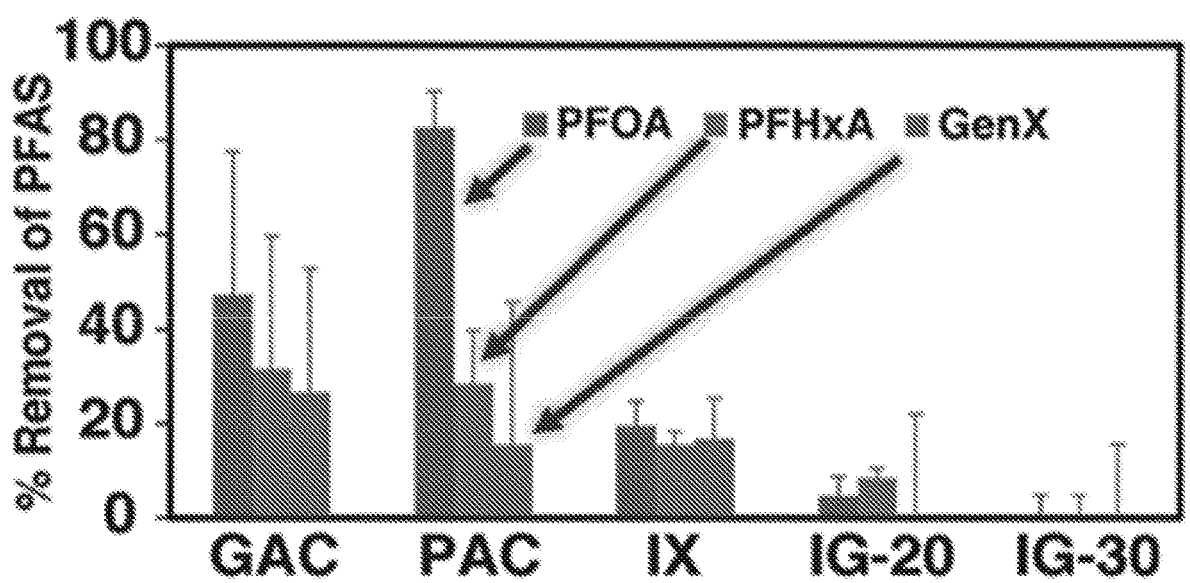

The PFAS removal efficiency of each exemplary fluorinated ionic polymer network formulation was tested by conducting batch equilibrium adsorption experiments in simulated groundwater, which was formulated by adding 200 mg/L NaCl and 20 mg/L humic acid to deionized water. Three PFAS that represent long chain (PFOA), short chain (perfluorohexanoic acid, PFHxA), and branched (GenX) PFAS were spiked into the matrix each at an environmentally relevant concentration (1.0 µg/L). After exposing the contaminated water sample to 10 mg/L of exemplary fluorinated ionic polymer network for 21 hours, the PFAS removal efficiency was analyzed by liquid chromatography mass spectrometry (LC-MS). The results of this systematic study revealed valuable structure-property information, see FIGS. 1A-1F. FIG. 1A shows equilibrium PFAS removal by fluorinated ionic polymer networks with amine (F-X) or ammonium (IF-X) groups where X=0, 20, or 30 wt %. FIG. 1B shows equilibrium PFAS removal by GAC, PAC, IX and fluorinated ionic polymer networks (IG-X) made with a PEG-DMA, where X=20 or 30 wt %. Additives: 200 mg/L NaCl and 20 mg/L humic acid; Adsorbent: 10 mg/L; PFAS: (PFOA, PFHxA, GenX, 1 µg L$^{-1}$ each); Equilibrium time: 21 h. In FIGS. 1A and 1B Error bars: Standard deviation of 3 experiments.

SCHEME 1

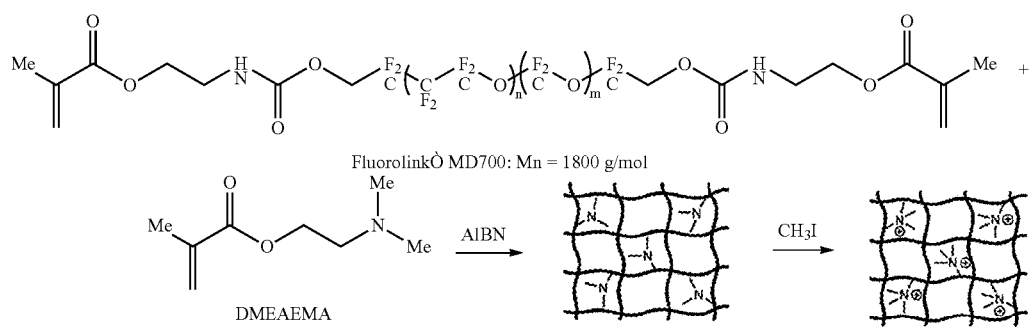

Figure 1C:
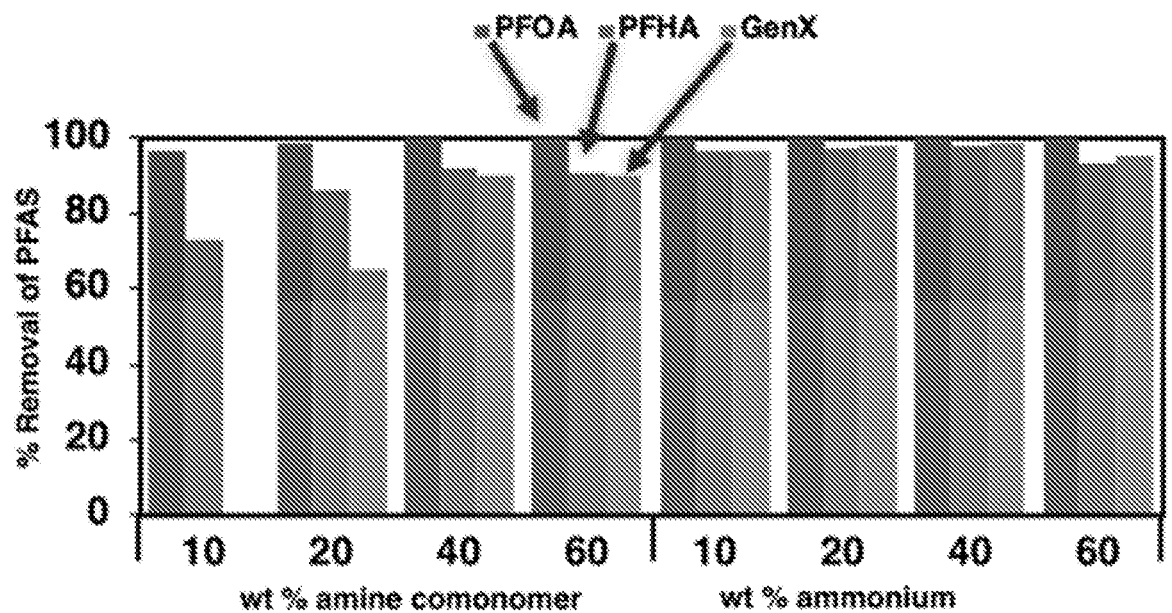

The composition of DMAEMA in the exemplary fluorinated ionic polymer network was varied from 10-60% (wt %) compared to Fluorolink® to generate a systematic library of materials that varies the ratio of fluorophilic and charged components in the resin. Grinding and sieving the material FIG. 1C shows equilibrium PFAS removal efficiency of different compositions of fluorinated ionic polymer networks in presence of NaCl (200 ppm) and humic acid (20 ppm). PFAS: PFOA, PFHxA and GenX (each 50 µg/L). Adsorbent dosage: 100 mg/L. Equilibrium time: 21 h.

Figure 1D:
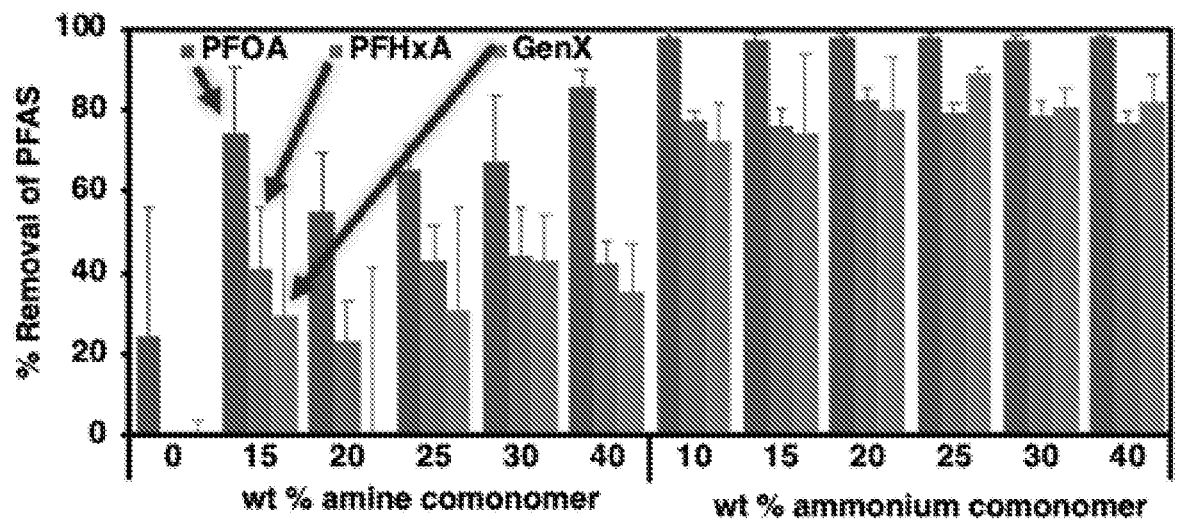

FIG. 1D shows equilibrium PFAS removal efficiency by various compositions of fluorinated ionic polymer networks in presence of NaCl (200 ppm) and humic acid (20 ppm). PFAS: PFOA, PFHxA and GenX (each 1 μg/L). adsorbent dosage: 10 mg/L. equilibrium time: 21 h. The data points in the figure are an average of three experiments, and the error bar show their standard deviation.

Figure 1E:
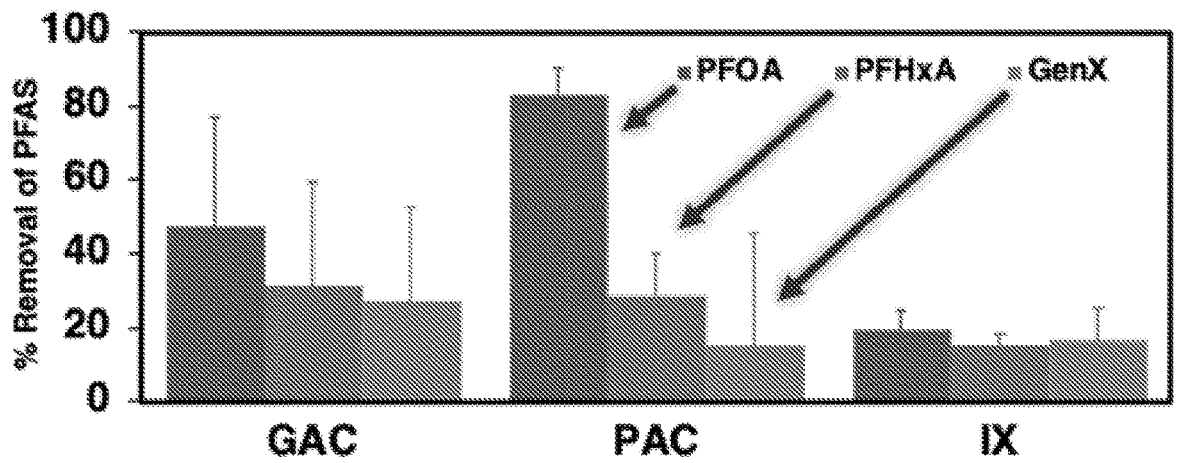

FIG. 1E shows equilibrium PFAS removal efficiency by granular activated carbon (GAC), powdered activated carbon (PAC) and ion-exchange resin (IX), in presence of NaCl (200 ppm) and humic acid (20 ppm). PFAS: PFOA, PFHxA and GenX (each 1 μg/L). adsorbent dosage: 10 mg/L. Equilibrium time: 21 h. The data points in the figure are an average of 3 experiments and the error bar show their standard deviation.

Figure 1F:
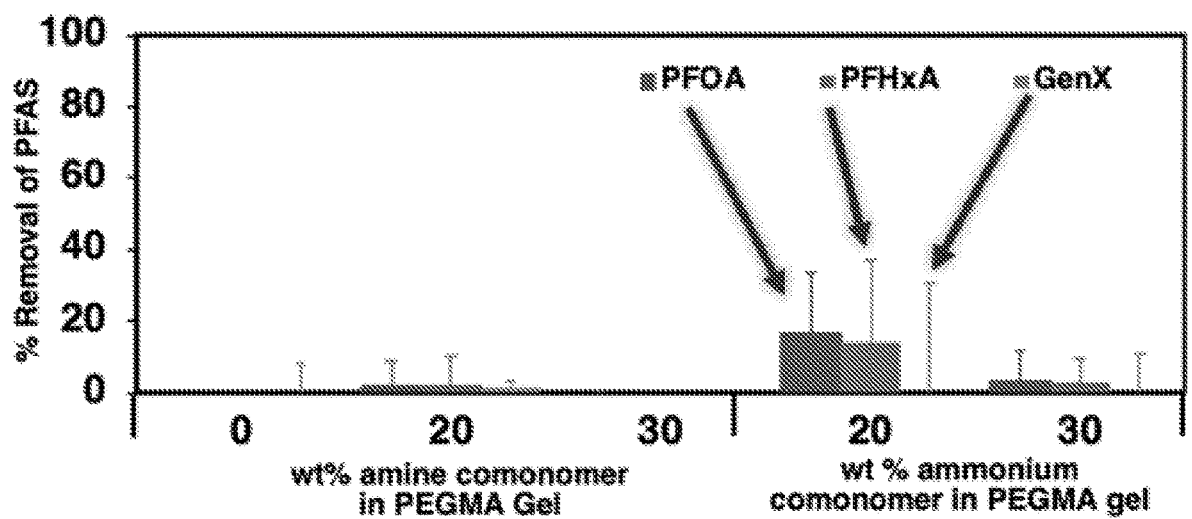

FIG. 1F shows equilibrium PFAS removal efficiency by fluorinated ionic polymer networks made from polyethylene glycol diacrylate (PEGDA, Mn 750) in presence of NaCl (200 ppm) and humic acid (20 ppm). PFAS: PFOA, PFHxA and GenX (each 1 μg/L). adsorbent dosage: 10 mg/L. equilibrium time: 21 h.

Exemplary fluorinated ionic polymer networks containing tertiary amines demonstrated lower affinity for PFAS than the respective materials that contained quaternary ammonium groups across all formulations tested, proving the importance of incorporating permanent charge. Additionally, a minimum of 20 wt % ammonium was required to demonstrate acceptable (>80%) removal of short-chain PFAS, PFHxA, and GenX.

Comparing exemplary fluorinated ionic polymer networks against materials made to serve as controls illustrated the synergistic roles of fluorous interactions and ion exchange behavior. Removing ionic groups and exposing a fluorinated ionic polymer network made from Fluorolink MD 700 to the equilibrium absorption experiment led to no removal of PFHxA or GenX. Furthermore, exemplary fluorinated ionic polymer networks made with a hydrocarbon equivalent of PFPEs demonstrated poor results for all formulations tested (<10% removal for all PFAS). These experiments point to the significance of incorporating both a fluorophilic matrix and ionic groups within the same fluorinated ionic polymer network.

Commercial materials previously identified for PFAS removal were subsequently tested under the described equilibrium absorption conditions. Samples of GAC (Filtrasorb 400), powdered activated carbon (PAC, PicaHydro MP23) and an anion exchange resin (PFA 694E) were exposed to simulated groundwater for 21 hours at a resin loading of 10 mg/L (Zaggia, A., Water Res. 2016, 91, 137-146). The absorption of these commercial material for short-chain PFAS is shown in FIG. 1B. These head-to-head comparisons demonstrate the selectivity of the fluorinated ionic polymer networks disclosed herein for PFAS compared to conventional technologies, particularly in a complex matrix that contains a 20,000 times higher concentration of organic contaminants (humic acid) compared to each PFAS.

Figure 2A:
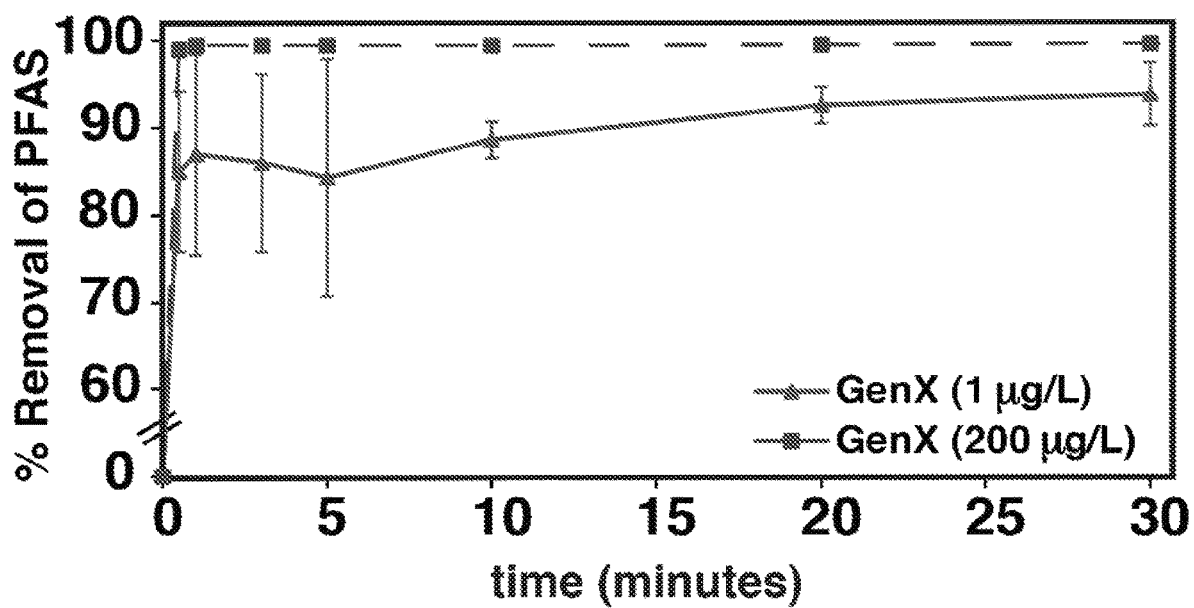
FIGS. 2A-2G absorption kinetics of GenX with fluorinated ionic polymer networks.
Figure 2B:
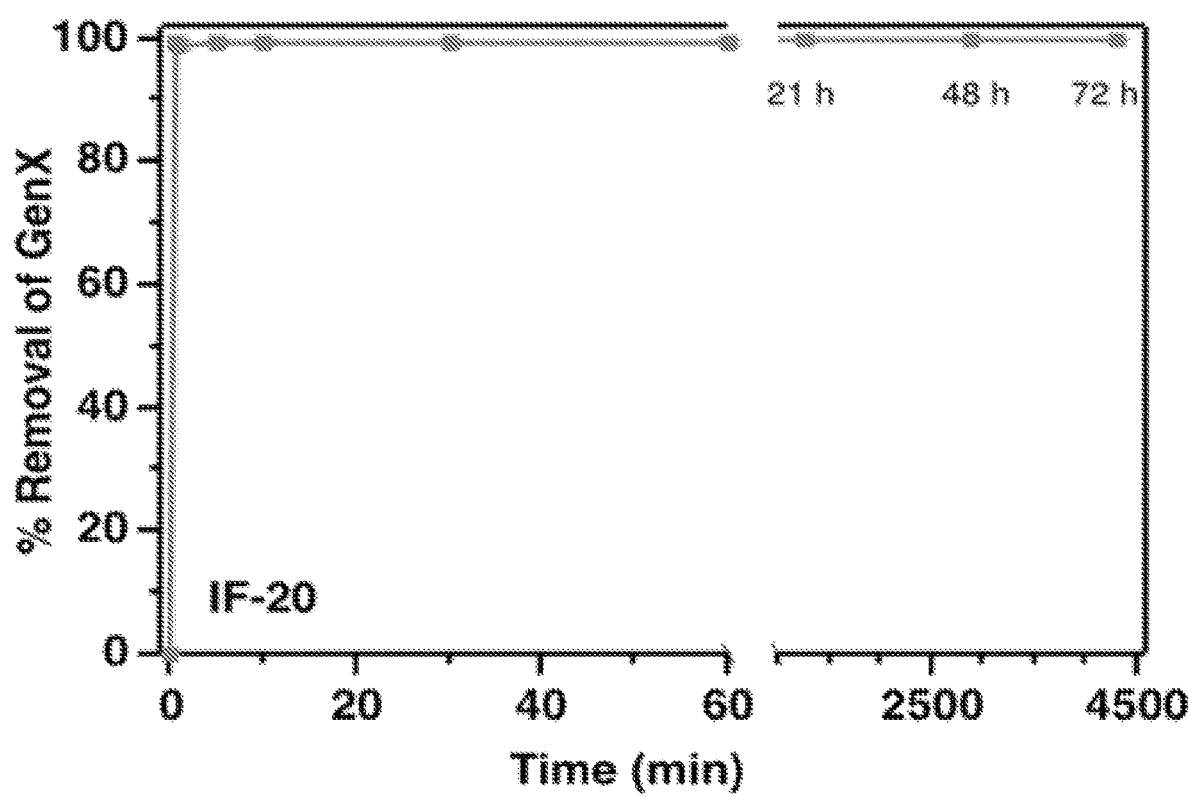
Figure 2C:
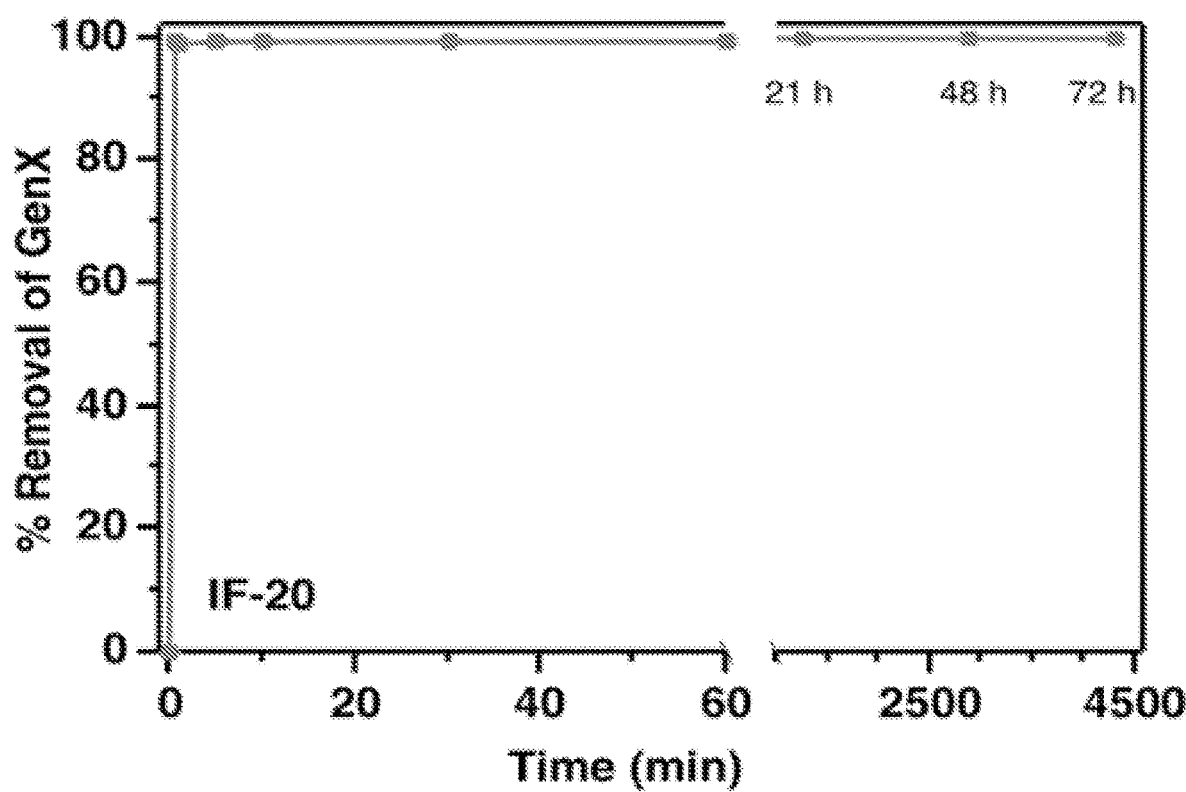
Figure 2D:
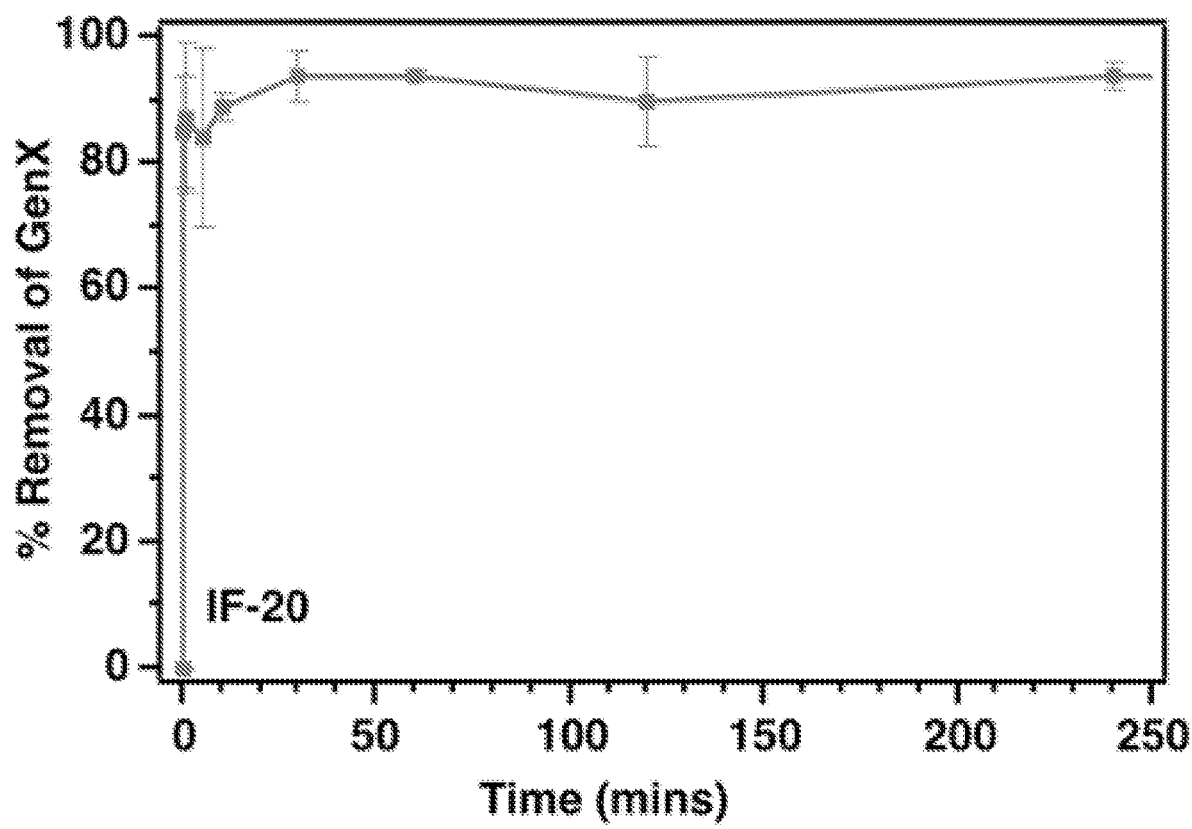
Figure 2E:
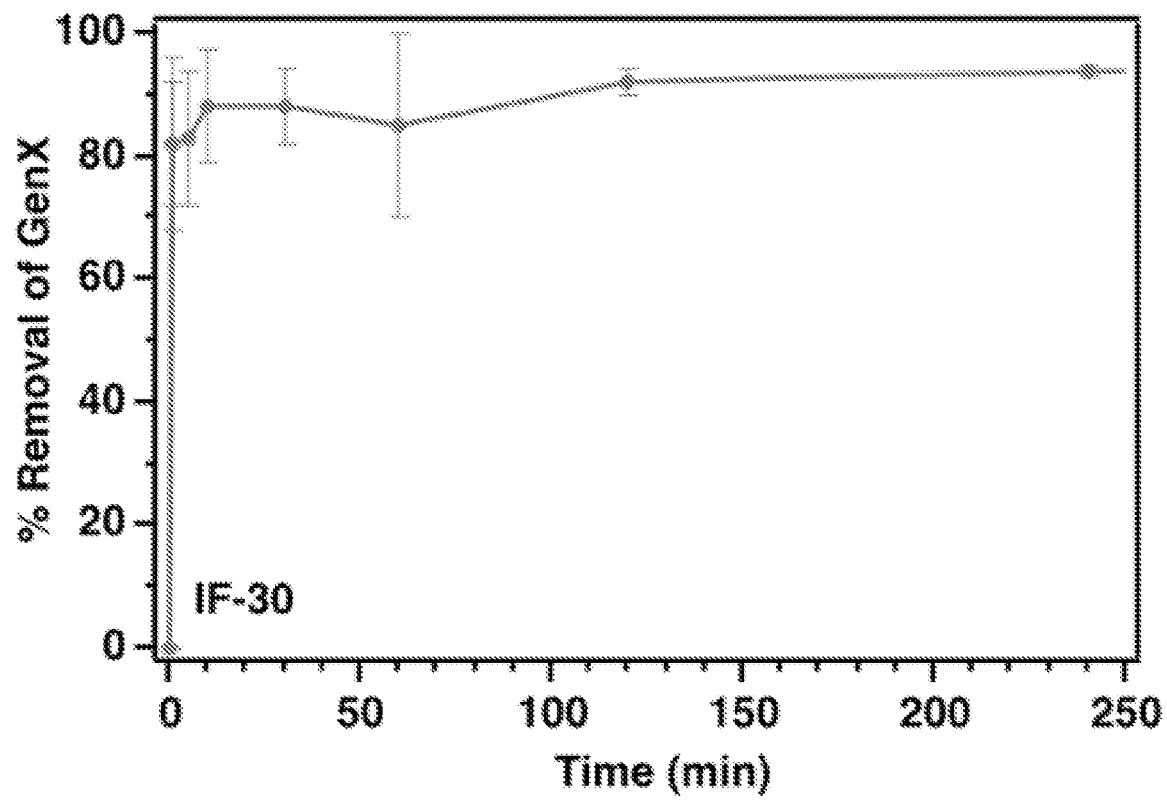
Figure 2F:
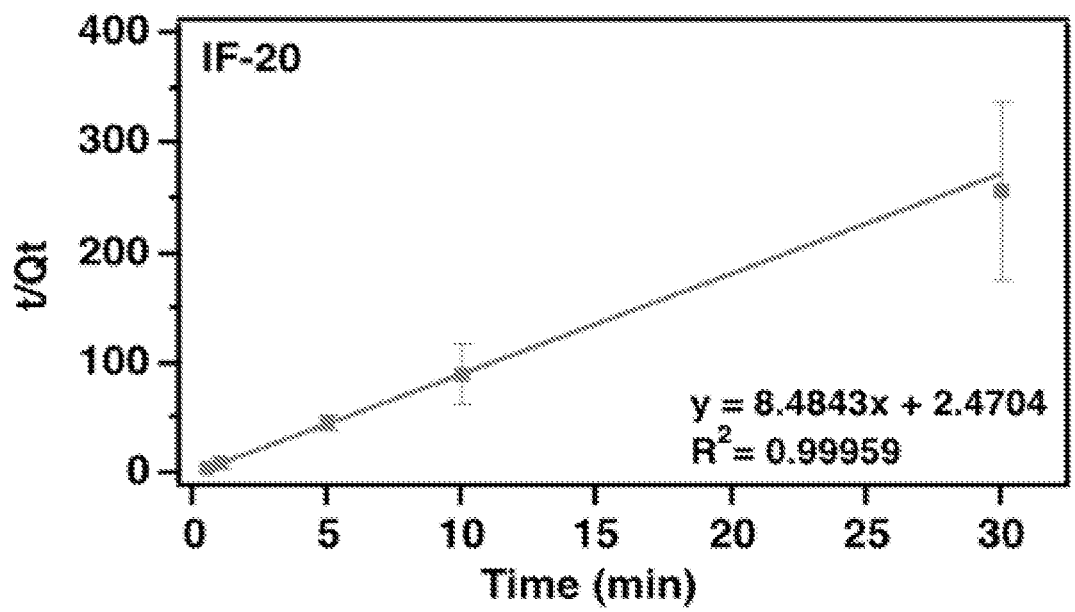
Figure 2G:
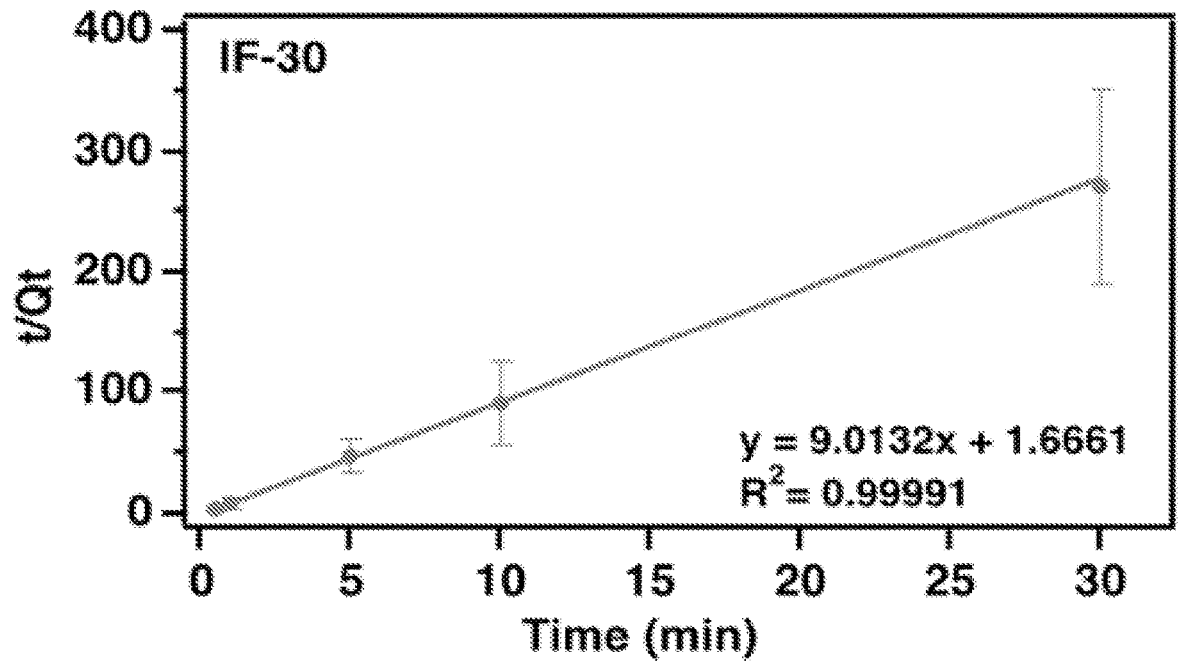

GenX was chosen for the testing as an emerging short-chain contaminant to investigate the kinetics of absorption and capacity of the fluorinated ionic polymer networks disclosed herein. The formulation containing 20 wt % and 30 wt % quaternized DMAEMA compared to PFPE were investigated. The absorption kinetics of GenX at high concentration (200 μg/L) by the fluorinated ionic polymer network containing 20 wt % quaternized DMAEMA (100 mg/L) was analyzed in deionized water (see FIGS. 2A-2G). FIG. 2A shows time dependent GenX adsorption by a fluorinated ionic polymer network with 20 wt % quaternized DMEAMA at high (red, dashed; GenX=200 μg $L^{-1}$; adsorbent=100 mg $L^{-1}$) and low concentration (blue; GenX=1 μg $L^{-1}$; adsorbent=10 mg $L^{-1}$). Error bars: Standard deviation of three experiments. FIG. 2B-2C show kinetics of GenX (200 μg/L) adsorption by a fluorinated ionic polymer network with 20 wt % quaternized DMEAMA (FIG. 2B) and a fluorinated ionic polymer network with 30 wt % quaternized DMEAMA (FIG. 2C). Adsorbent dosage: 100 mg/L. The data points in the figure are an average of 3 experiments and the error bar show their standard deviation. FIGS. 2D-2E show kinetics of GenX (1 μg/L) adsorption by a fluorinated ionic polymer network with 20 wt % quaternized DMEAMA (FIG. 2D) and a fluorinated ionic polymer network with 30 wt % quaternized DMEAMA (FIG. 2E). Adsorbent dosage: 10 mg/L. The data points in the figure are an average of 3 experiments and the error bar show their standard deviation. FIGS. 2F-2G show pseudo second order plots of a fluorinated ionic polymer network with 20 wt % quaternized DMEAMA (FIG. 2F) and a fluorinated ionic polymer network with 30 wt % quaternized DMEAMA (FIG. 2G). Adsorbent dosage: 10 mg/L; GenX: 1 μg/L. The data points in the figure are an average of 3 experiments and the error bar show their standard deviation.

In this system, rapid and quantitative removal of GenX was observed within 30 seconds. No desorption was observed out to 72 hours, suggesting the adsorption into the fluorinated ionic polymer network is irreversible. Similarly, the adsorption kinetics at an environmentally relevant concentration of GenX (1 μg/L) by the fluorinated ionic polymer network (10 mg/L) was also rapid, demonstrating 94% removal within 30 mins and no desorption over time (FIGS. 2A-AG). This removal efficiency for GenX results in a final concentration under the limit set by the state of North Carolina (140 ng/L).

Figure 3A:
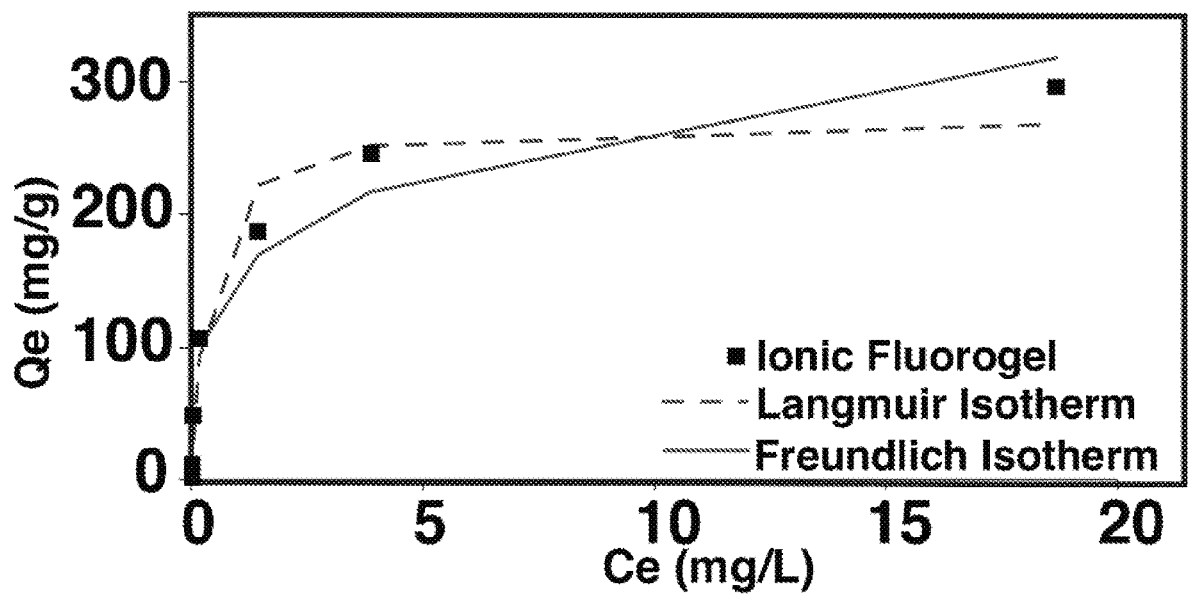
FIGS. 3A-3H shows GenX binding isotherm with fluorinated ionic polymer networks, and regeneration of fluorinated ionic polymer networks.
Figure 3B:
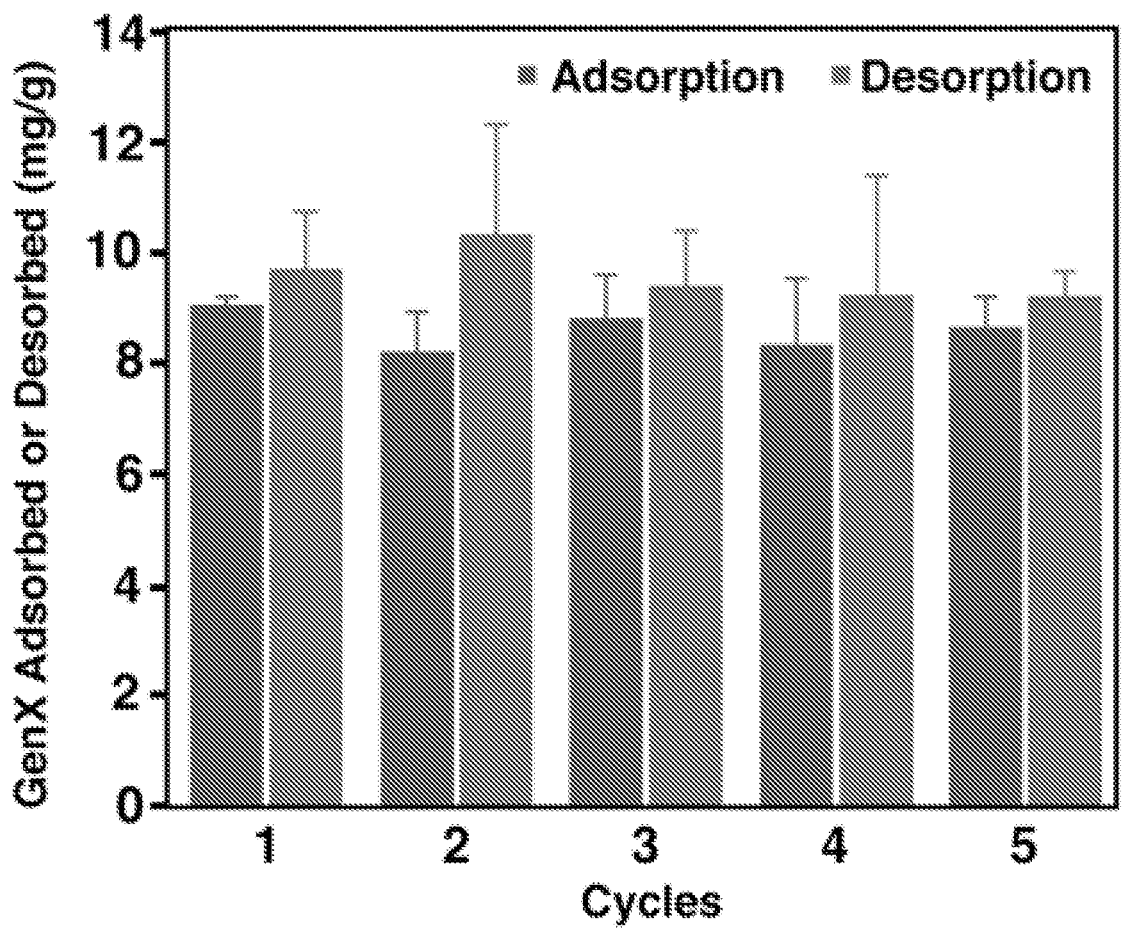

A GenX binding isotherm was constructed to investigate the binding capacity of the fluorinated ionic polymer network containing 20 wt % quaternized DMAEMA. The concentration of the fluorinated ionic polymer network was fixed at 100 mg/L while the GenX concentration was varied from 0.20-50 mg/L. Data from triplicate experiments (see FIG. 3A) was fit to the Langmuir adsorption model to yield an affinity coefficient (KL) of $5.9 \times 10^6$ $M^{-1}$ and an estimated GenX capacity ($Q_m$) of 278 mg/g. These represent the highest reported values in the literature for GenX. The isotherm was also fit to Freundlich model and the Freundlich's constant ($K_F$) and the intensity of adsorption (n) were found to be 141 $(mg/g)(L/mg)^{1/n}$ and 2.2 respectively. Subsequently, the fluorinated ionic polymer network was tested for its ability to be regenerated for multiple reuse cycles (FIGS. 3B and 3H).

Figure 3C:
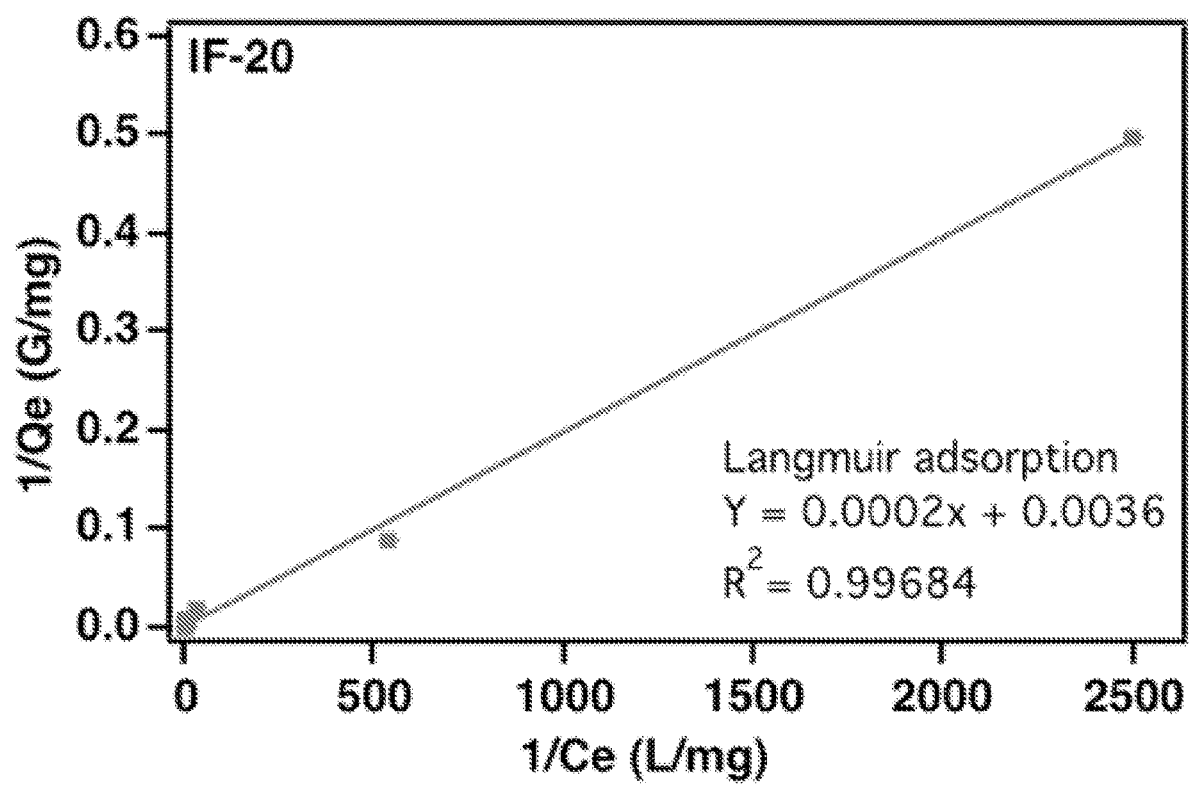
Figure 3D:
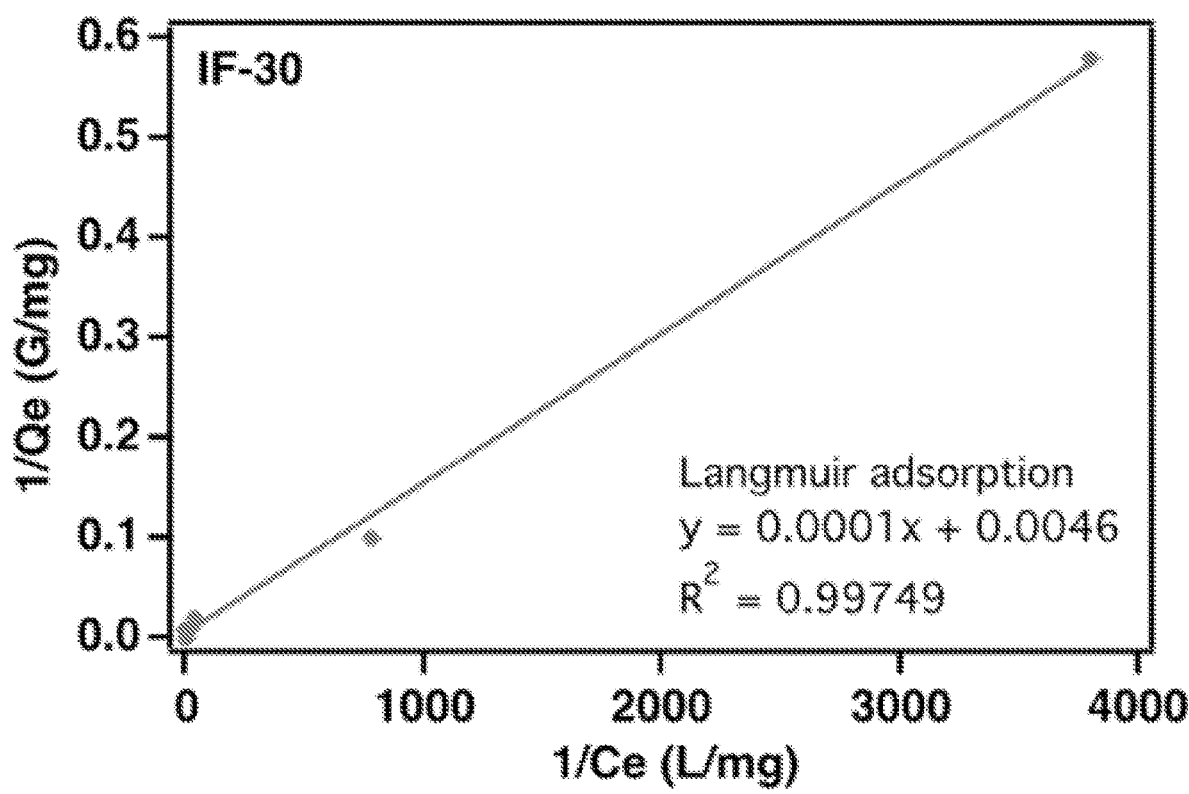

FIGS. 3C-3D show GenX adsorption isotherm linear fitted to Langmuir model for a fluorinated ionic polymer network with 20 wt % quaternized DMEAMA (FIG. 3C) and a fluorinated ionic polymer network with 30 wt % quaternized DMEAMA (FIG. 3D). Adsorbent dosage: 100 mg/L; [GenX]: 0.2-50 mg/L. The data points in the figure are an average of three experiments, and the error bar show their standard deviation.

Figure 3E:
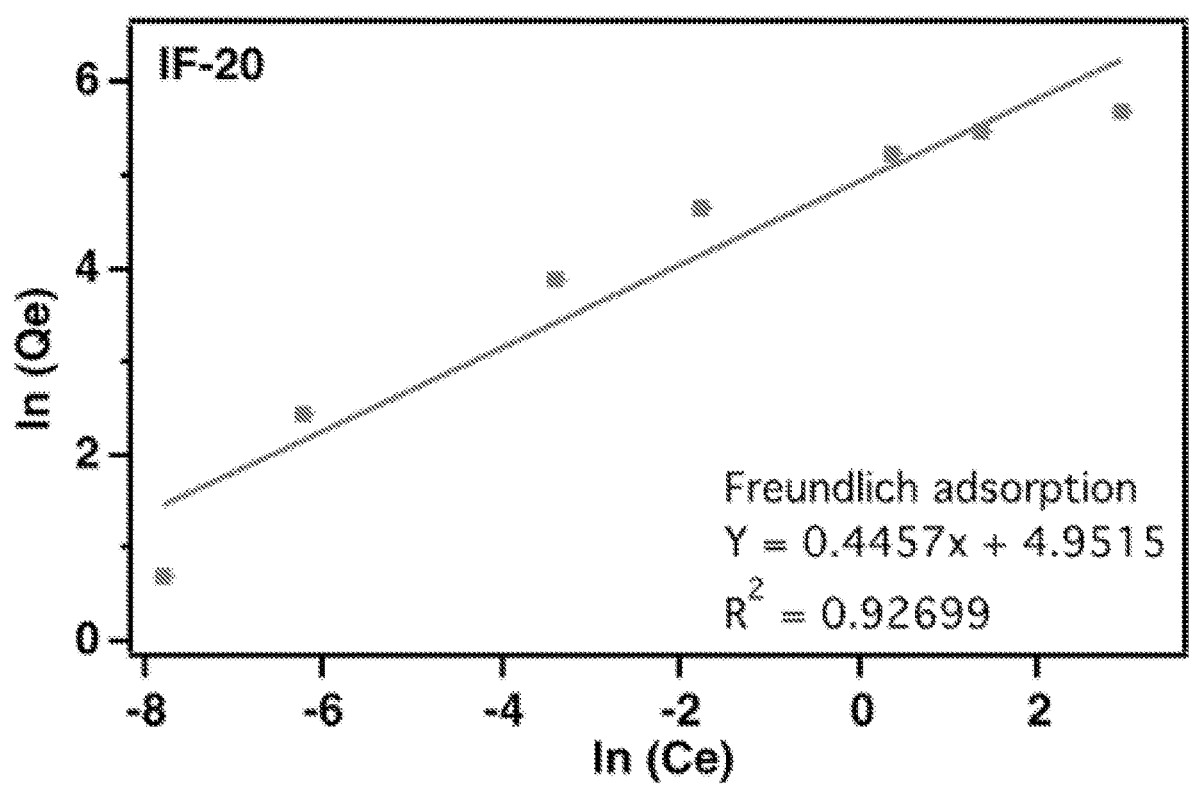
Figure 3F:
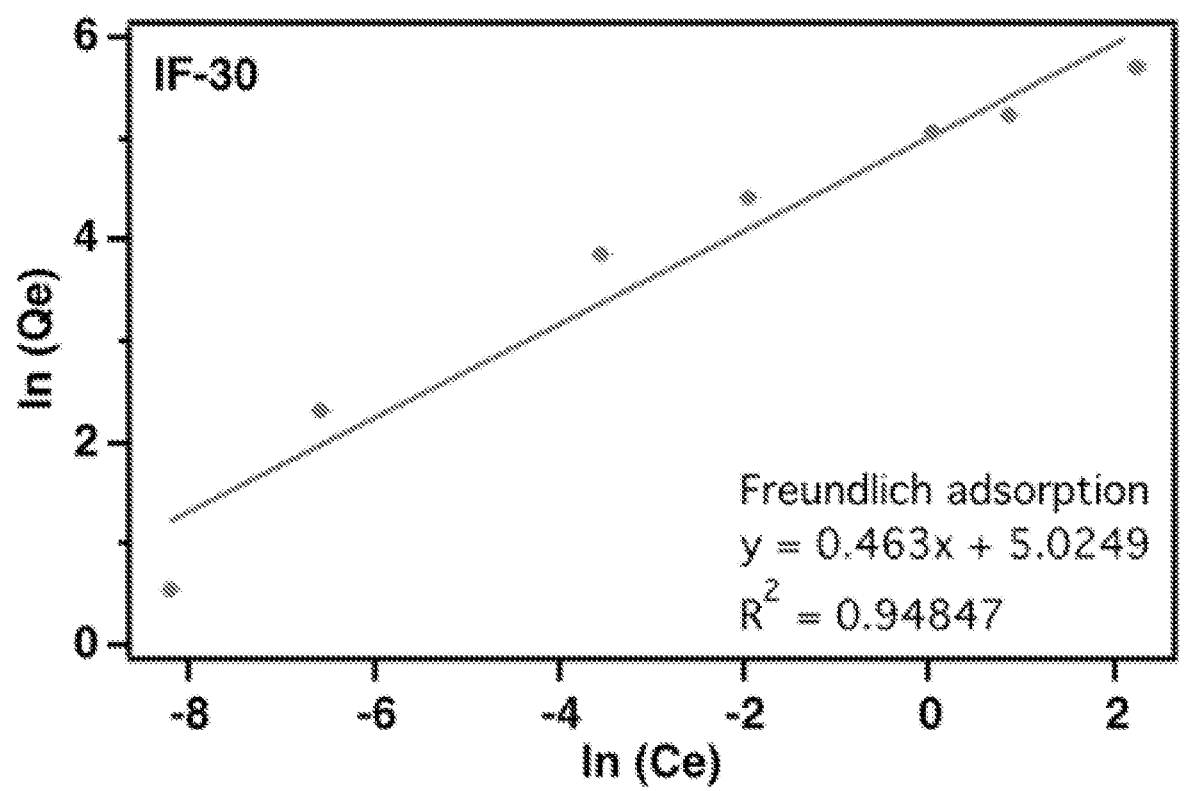

FIGS. 3E-3F show GenX adsorption isotherm linear fitted to Freundlich model for a fluorinated ionic polymer network with 20 wt % quaternized DMEAMA (FIG. 3E) and a fluorinated ionic polymer network with 30 wt % quaternized DMEAMA (FIG. 3F). Adsorbent dosage: 100 mg/L; [GenX]: 0.2-50 mg/L. The data points in the figure are an average of 3 experiments and the error bar show their standard deviation.

Figure 3G:
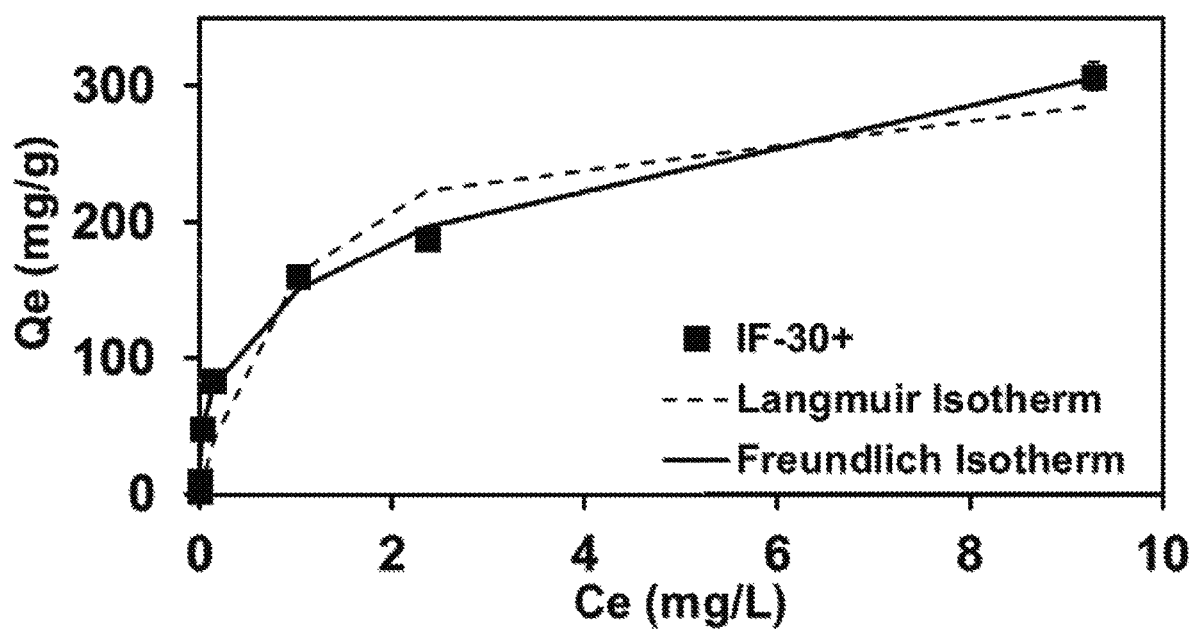
Figure 3H:
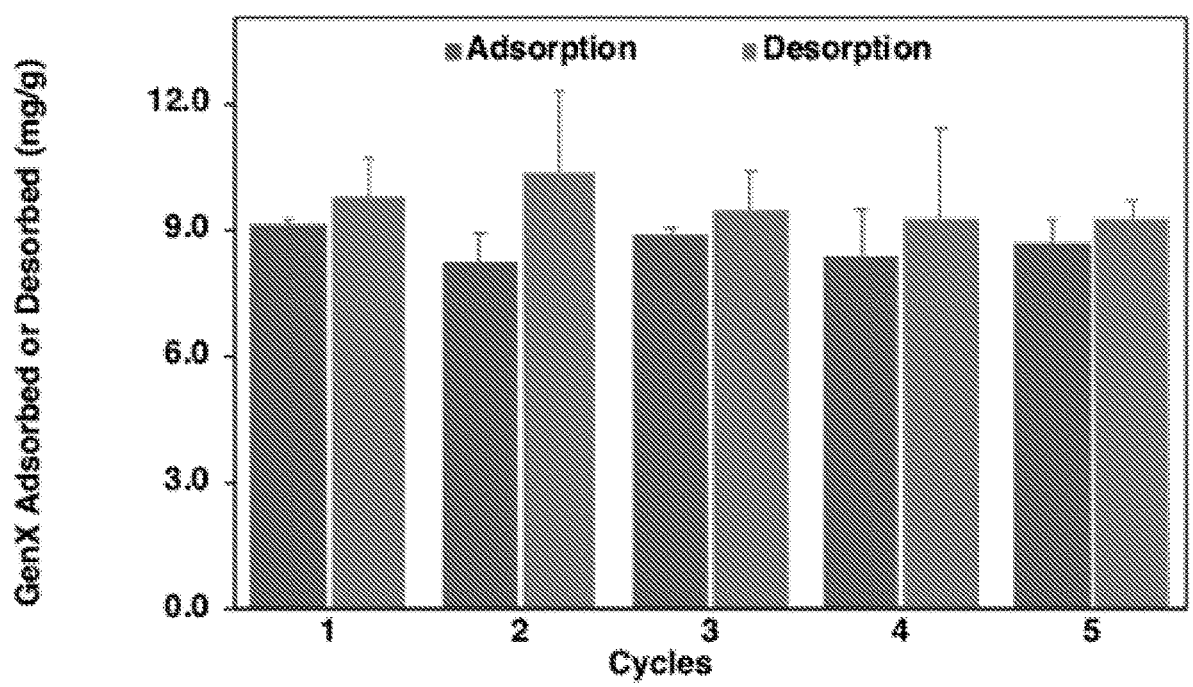

FIGS. 3A and 3G show GenX adsorption isotherm for a fluorinated ionic polymer network with 20 wt % quaternized DMEAMA (FIG. 3A) and a with 30 wt % quaternized DMEAMA (FIG. 3G). Dotted lines represent fit to Langmuir and Freundlich models. Adsorbent dosage: 100 mg/L; [GenX]: 0.2-50 mg/L. The data points in the figure are an average of 3 experiments and the error bar show their standard deviation.

FIG. 3H shows regeneration and reuse of fluorinated ionic polymer network IF-20 with 400 mM methanolic ammonium acetate. Adsorbent dosage: 20 mg; [GenX]: 10 mg $L^{-1}$, 20 mL. Extraction: IF-20 was extracted with 400 mM methanolic ammonium acetate over 2 minutes.

Adsorption experiments were performed by loading the fluorinated ionic polymer network containing 20 wt % quaternized DMAEMA onto a PTFE syringe filter (0.45 µm, 25 mm diameter). A GenX solution (10 mg/L, 20 mL) was passed through the filter over 2 minutes, and the residual GenX concentration in the filtrate was analyzed by LC-MS. The results showed >90% removal of GenX from the solution in such flow-through conditions, thus demonstrating the efficiency of absorption even under short residence time conditions. Complete extraction of adsorbed GenX from the fluorinated ionic polymer network was achieved by washing the material with a 400 mM methanolic ammonium acetate solution (20 mL, 2 min). This process was repeated five times without loss of efficiency in adsorption or reuse.

The tested fluorinated ionic polymer network provided rapid, efficient, and high capacity removal of a variety of PFAS under laboratory conditions. Natural water matrices, however, contains a cocktail of organic and inorganic contaminants that are difficult to model in a laboratory setting. To validate the fluorinated ionic polymer networks disclosed herein as a for PFAS removal from water, therefore, tests were conducted on settled water collected at a site previously affected by PFAS contamination, the Sweeney Water Treatment Plant in Wilmington, NC. In addition to PFAS found in the water upon collection (at levels of 20-50 ng/L), the water was spiked the matrix with 21 emerging and legacy PFAS. The natural water matrix was exposed to the fluorinated ionic polymer network containing 30 wt % quaternized DMAEMA (100 mg/L) and PFAS removal was analyzed at 30 minutes and 2 hours, with the data presented being the average of two experiments. The results show good PFAS removal after two hours, see FIG. 4A-4B, which shows complete analysis of 21 different PFAS.

Figure 4A:
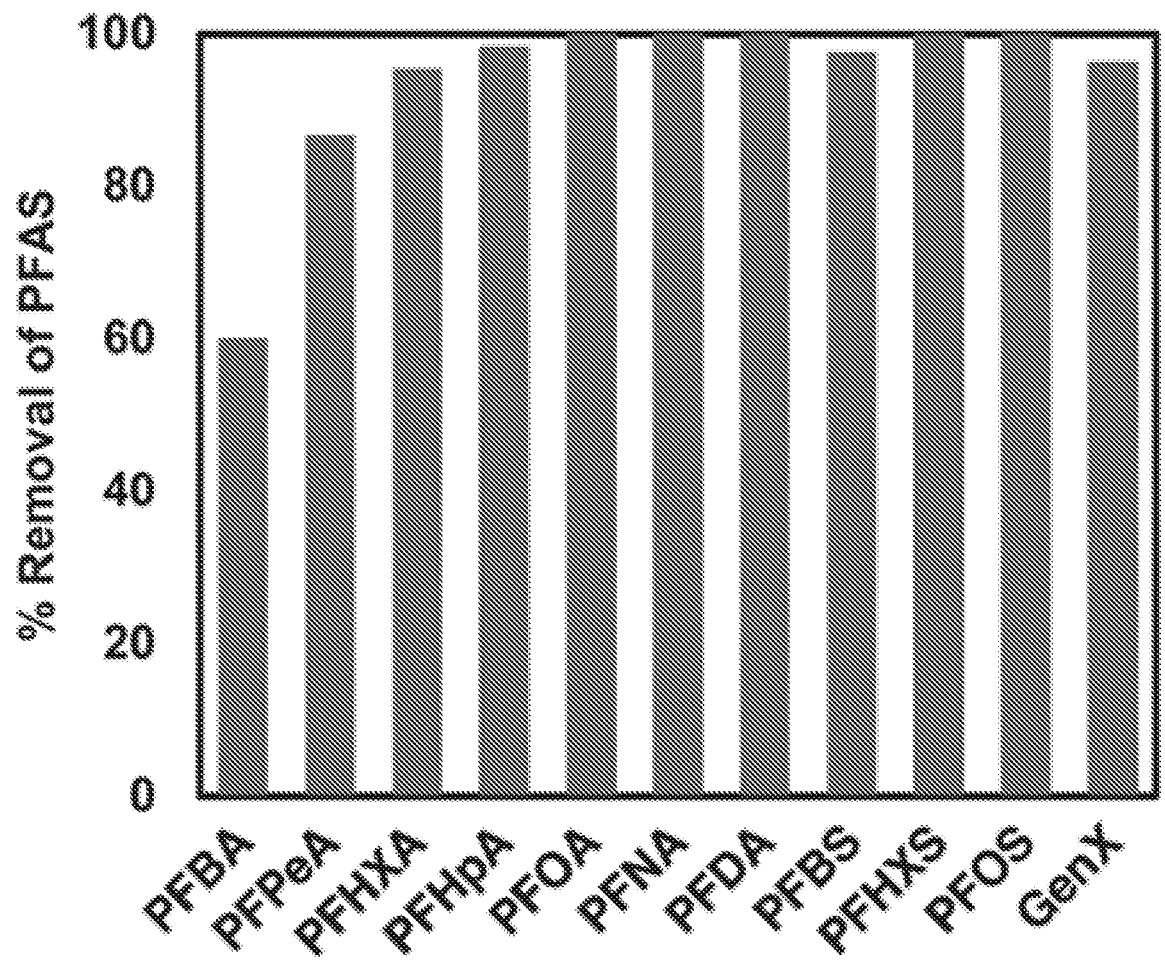
FIGS. 4A-4B shows PFAS absorption by fluorinated ionic polymer networks.

FIG. 4A shows the removal of 10 representative PFASs after 2 hours by the fluorinated ionic polymer network containing 30 wt % quaternized DMAEMA from groundwater settled water collected at the Sweeney Water Treatment Plant in Wilmington, NC. [Adsorbent]=100 mg $L^{-1}$; [PFAS]=1 µg $L^{-1}$.

Figure 4B:
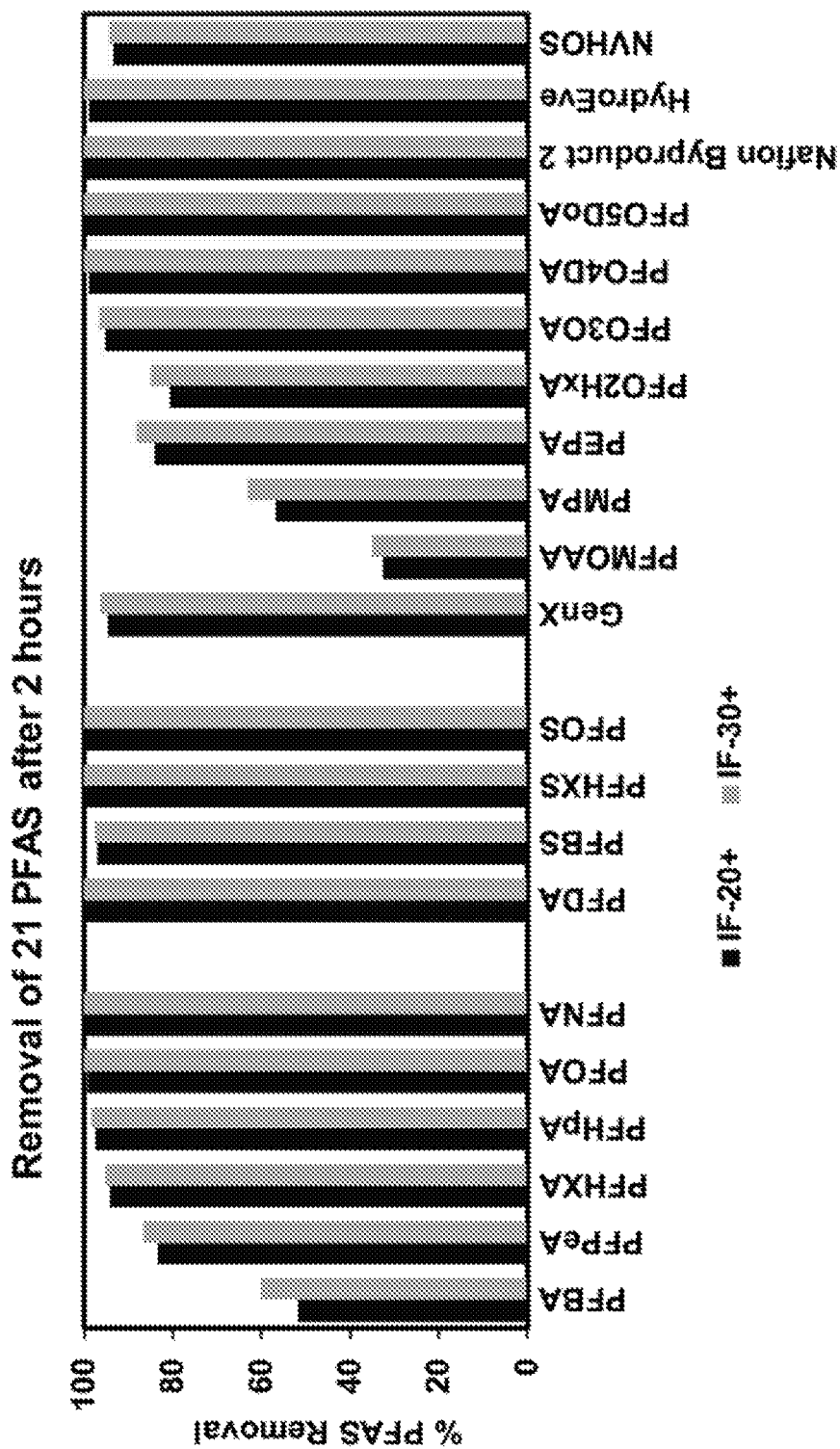

FIG. 4B shows twenty-one PFAS absorptions by a fluorinated ionic polymer network with 20 wt % quaternized DMEAMA and a fluorinated ionic polymer network with 30 wt % quaternized DMEAMA Adsorbent dosage: 100 mg/L; [PFAS]: 1 µg/L each. The data shown are an average of duplicate experiments.

Short chain PFAS that are traditionally challenging to absorb, including PFHxA, GenX, and PFBS, were removed from the water at >95% efficiency with the fluorinated ionic polymer network. No evidence of long chain PFAS such as PFOA and PFOS in the solution down to the detection limit of the LC-MS were observed. Lastly, the fluorinated ionic polymer network performed equal to or better than the previously best materials reported for removing the short chain perfluorinated carboxylic acids PFBA and PFPeA, achieving 60% and 88%, respectively, see FIG. 4A-4B).

The fluorinated ionic polymer networks disclosed herein is a platform for polymeric adsorbent to remove PFAS from water at environmentally relevant concentrations. The synergistic combination of the fluorous and electrostatic interactions results in high affinity, high capacity, and rapid sorption of PFASs.

D. References

Banks, R. E.; Smart, B. E.; Tatlow, J. C. *Organofluorine Chemistry: Principles and Commercial Applications*; Springer US: Boston, MA, 1994.

Knepper, T. P.; Lange, F. T. *Polyfluorinated Chemicals and Transformation Products*; Springer Science & Business Media, 2011; Vol. 17.

Kotthoff, M.; Müller, J.; Jürling, H.; Schlummer, M.; Fiedler, D. Perfluoroalkyl and Polyfluoroalkyl Substances in Consumer Products. *Environ. Sci. Pollut. Res.* 2015, 22 (19), 14546-14559.

Lindstrom, A. B.; Strynar, M. J.; Libelo, E. L. Polyfluorinated Compounds: Past, Present, and Future. *Environ. Sci. Technol.* 2011, 45 (19), 7954-7961. https://doi.org/10.1021/es2011622.

Hu, X. C.; Andrews, D. Q.; Lindstrom, A. B.; Bruton, T. A.; Schaider, L. A.; Grandjean, P.; Lohmann, R.; Carignan, C. C.; Blum, A.; Balan, S. A.; et al. Detection of Poly- and Perfluoroalkyl Substances (PFASs) in U.S. Drinking Water Linked to Industrial Sites, Military Fire Training Areas, and Wastewater Treatment Plants. *Environ. Sci. Technol. Lett.* 2016, 3 (10), 344-350. https://doi.org/10.1021/acs.estlett.6b00260.

Darrow, L. A.; Groth, A. C.; Winquist, A.; Shin, H.-M.; Bartell, S. M.; Steenland, K. Modeled Perfluorooctanoic Acid (PFOA) Exposure and Liver Function in a Mid-Ohio Valley Community. *Environ. Health Perspect.* 2016, 124 (8), 1227-1233.

Quaak, I.; de Cock, M.; de Boer, M.; Lamoree, M.; Leonards, P.; van de Bor, M. Prenatal Exposure to Perfluoroalkyl Substances and Behavioral Development in Children. *Int. J. Environ. Res. Public Health* 2016, 13 (5), 511.

Kataria, A.; Trachtman, H.; Malaga-Dieguez, L.; Trasande, L. Association between Perfluoroalkyl Acids and Kidney Function in a Cross-Sectional Study of Adolescents. *Environ. Heal.* 2015, 14 (1), 89.

Barry, V.; Winquist, A.; Steenland, K. Perfluorooctanoic Acid (PFOA) Exposures and Incident Cancers among Adults Living Near a Chemical Plant. *Environ. Health Perspect.* 2013, 121 (11-12), 1313-1318. https://doi.org/10.1289/ehp.1306615.

Melzer, D.; Rice, N.; Depledge, M. H.; Henley, W. E.; Galloway, T. S. Association between Serum Perfluorooctanoic Acid (PFOA) and Thyroid Disease in the US National Health and Nutrition Examination Survey. *Environ. Health Perspect.* 2010, 118 (5), 686-692.

Chang, E. T.; Adami, H.-O.; Boffetta, P.; Wedner, H. J.; Mandel, J. S. A Critical Review of Perfluorooctanoate and Perfluorooctanesulfonate Exposure and Immunological Health Conditions in Humans. *Crit. Rev. Toxicol.* 2016, 46 (4), 279-331.

Sun, M.; Arevalo, E.; Strynar, M.; Lindstrom, A.; Richardson, M.; Kearns, B.; Pickett, A.; Smith, C.; Knappe, D. R. U. Legacy and Emerging Perfluoroalkyl Substances Are Important Drinking Water Contaminants in the Cape Fear River Watershed of North Carolina. *Environ. Sci. Technol. Lett.* 2016, 3 (12), 415-419. https://doi.org/10.1021/acs.estlett.6b00398.

Cousins, I. T.; Vestergren, R.; Wang, Z.; Scheringer, M.; Mclachlan, M. S. The Precautionary Principle and Chemicals Management: The Example of Perfluoroalkyl Acids in Groundwater. *Environ. Int.* 2016, 94, 331-340. https://doi.org/10.1016/j.envint.2016.04.044.

Boone, J. S.; Vigo, C.; Boone, T.; Byrne, C.; Ferrario, J.; Benson, R.; Donohue, J.; Simmons, J. E.; Kolpin, D. W.; Furlong, E. T. Per- and Polyfluoroalkyl Substances in Source and Treated Drinking Waters of the United States. *Sci. Total Environ.* 2019, 653, 359-369.

Drinking Water Health Advisory for Perfluorooctanoic Acid (PFOA); 2016.

Dagnino, S.; McMahen, R.; Liang, S.; Lindstrom, A.; Andersen, E.; McMillan, L.; Thurman, M.; Ferrer, I.; Ball, C. Identification of Novel Perfluoroalkyl Ether Carboxylic Acids (PFECAs) and Sulfonic Acids (PFESAs) in Natural Waters Using Accurate Mass Time-of-Flight Mass Spectrometry (TOFMS). *Environ. Sci. Technol.* 2015, 49 (19), 11622-11630. https://doi.org/10.1021/acs.est.5b01215.

Mccord, J.; Strynar, M. Identification of Per- and Polyfluoroalkyl Substances in the Cape Fear River by High Resolution Mass Spectrometry and Nontargeted Screening. *Environ. Sci. Technol.* 2019, 53, 4717-4727. https://doi.org/10.1021/acs.est.8b06017.

Ross, I.; McDonough, J.; Miles, J.; Storch, P.; Thelakkat Kochunarayanan, P.; Kalve, E.; Hurst, J.; S. Dasgupta, S.; Burdick, J. A Review of Emerging Technologies for Remediation of PFASs. *Remediation* 2018, 28 (2), 101-126. https://doi.org/10.1002/rem.21553.

Hopkins, Z. R.; Sun, M.; DeWitt, J. C.; Knappe, D. R. U. Recently Detected Drinking Water Contaminants: GenX and Other Per- and Polyfluoroalkyl Ether Acids. *J. Am. Water Works Assoc.* 2018, 110 (7), 13-28. https://doi.org/10.1002/awwa.1073.

Schachtman, B. CFPUA Filtered Water Still Has More Contaminants than Raw Water. Here's Why, and What's Being Done. *Port City Daily*. Wilmington, NC 2019.

Alsbaiee, A.; Smith, B. J.; Xiao, L.; Ling, Y.; Helbling, D. E.; Dichtel, W. R. Rapid Removal of Organic Micropollutants from Water by a Porous β-Cyclodextrin Polymer. *Nature* 2016, 529 (7585), 190-194. https://doi.org/10.1038/nature16185.

Xiao, L.; Ling, Y.; Alsbaiee, A.; Li, C.; Helbling, D. E.; Dichtel, W. R. β-Cyclodextrin Polymer Network Sequesters Per Fl Uorooctanoic Acid at Environmentally Relevant Concentrations. *J. Am. Chem. Soc.* 2017, 139, 7680-7692. https://doi.org/10.1021/jacs.7b02381.

Ling, Y.; Klemes, M. J.; Xiao, L.; Alsbaiee, A.; Dichtel, W. R.; Helbling, D. E. Benchmarking Micropollutant Removal by Activated Carbon and Porous β-Cyclodextrin Polymers under Environmentally Relevant Scenarios. *Environ. Sci. Technol.* 2017, 51, 7590-7598. https://doi.org/10.1021/acs.est.7b00906.

Xiao, L.; Ching, C.; Ling, Y.; Nasiri, M.; Klemes, M. J.; Reineke, T. M.; Helbling, D. E.; Dichtel, W. R. Cross-Linker Chemistry Determines the Uptake Potential of Perfluorinated Alkyl Substances by β-Cyclodextrin Polymers. *Macromolecules* 2019, 52, 3747-3752. https://doi.org/10.1021/acs.macromol.9b00417.

Klemes, M. J.; Ling, Y.; Ching, C.; Wu, V.; Helbling, D. E.; Dichtel, W. R. Reduction of a Tetrafluoroterephthalonitrile-β-Cyclodextrin Polymer to Remove Anionic Micropollutants and Perfluorinated Alkyl Substances from Water. *Angew. Chemie Int. Ed.* 2019. https://doi.org/10.1002/anie.201905142.

Ji, W.; Xiao, L.; Ling, Y.; Ching, C.; Matsumoto, M.; Bisbey, R. P.; Helbling, D. E.; Dichtel, W. R. Removal of GenX and Perfluorinated Alkyl Substances from Water by Amine-Functionalized Covalent Organic Frameworks. *J. Am. Chem. Soc.* 2018, 140 (40), 12677-12681. https://doi.org/10.1021/jacs.8b06958.

Cao, F.; Wang, L.; Ren, X.; Sun, H. Synthesis of a Perfluorooctanoic Acid Molecularly Imprinted Polymer for the Selective Removal of Perfluorooctanoic Acid in an Aqueous Environment. *J. Appl. Polym. Sci.* 2016, 133 (15), 1-10. https://doi.org/10.1002/app.43192.

Yu, Q.; Deng, S.; Yu, G. Selective Removal of Perfluorooctane Sulfonate from Aqueous Solution Using Chitosan-Based Molecularly Imprinted Polymer Adsorbents. *Water Res.* 2008, 42 (12), 3089-3097. https://doi.org/10.1016/j.watres.2008.02.024.

Huang, P. J.; Hwangbo, M.; Chen, Z.; Liu, Y.; Kameoka, J.; Chu, K. H. Reusable Functionalized Hydrogel Sorbents for Removing Long- and Short-Chain Perfluoroalkyl Acids (PFAAs) and GenX from Aqueous Solution. *ACS Omega* 2018, 3 (12), 17447-17455. https://doi.org/10.1021/acsomega.8b02279.

Ateia, M.; Attia, M. F.; Maroli, A.; Tharayil, N.; Alexis, F.; Whitehead, D. C.; Karanfil, T. Rapid Removal of Poly- and Perfluorinated Alkyl Substances by Poly(Ethylenimine)-Functionalized Cellulose Microcrystals at Environmentally Relevant Conditions. *Environ. Sci. Technol. Lett.* 2018, 5 (12), 764-769. https://doi.org/10.1021/acs.estlett.8b00556.

Koda, Y.; Terashima, T.; Sawamoto, M. Fluorous Microgel Star Polymers: Selective Recognition and Separation of Polyfluorinated Surfactants and Compounds in Water. *J. Am. Chem. Soc.* 2014, 136, 15742-15748. https://doi.org/10.1021/ja508818j.

Koda, Y.; Terashima, T.; Takenaka, M.; Sawamoto, M. Star Polymer Gels with Fluorinated Microgels via Star-Star Coupling and Cross-Linking for Water Purification. *ACS Macro Lett.* 2015, 4 (4), 377-380. https://doi.org/10.1021/acsmacrolett.5b00127.

Zhang, W.; Curran, D. P. Synthetic Applications of Fluorous Solid-Phase Extraction (F-SPE). *Tetrahedron* 2006, 62 (51), 11837-11865. https://doi.org/10.1016/j.tet.2006.08.051.

Howell, J. L.; Perez, E. W.; Waterfeld, A.; Friesen, C. M.; Thrasher, J. S. Thermally Stable Perfluoropolyethers and Processes Therefor and Therewith. U.S. Pat. No. 6,753, 301B2, 2001.

Zaggia, A.; Conte, L.; Falletti, L.; Fant, M.; Chiorboli, A. Use of Strong Anion Exchange Resins for the Removal of Perfluoroalkylated Substances from Contaminated Drinking Water in Batch and Continuous Pilot Plants. *Water Res.* 2016, 91, 137-146. https://doi.org/10.1016/j.watres.2015.12.039.

Sun, M.; Arevalo, E.; Strynar, M.; Lindstrom, A.; Richardson, M.; Kearns, B.; Pickett, A.; Smith, C.; Knappe, D. R. U. *Environ. Sci. Technol. Lett.* 2016, 3, 415-419.

Ho, Y. S.; McKay, G. *Process Biochem.* 1999, 34, 451-465

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of removing a polyfluorinated alkyl compound from water, the method comprising absorbing the polyfluorinated alkyl compound from the water with a resin comprising a fluorinated ionic polymer network, wherein the fluorinated ionic polymer network is a co-polymer made from a) a monomer comprising an ion generating moiety or a monomer comprising an ion; and b) a monomer comprising a fluorine having a structure:

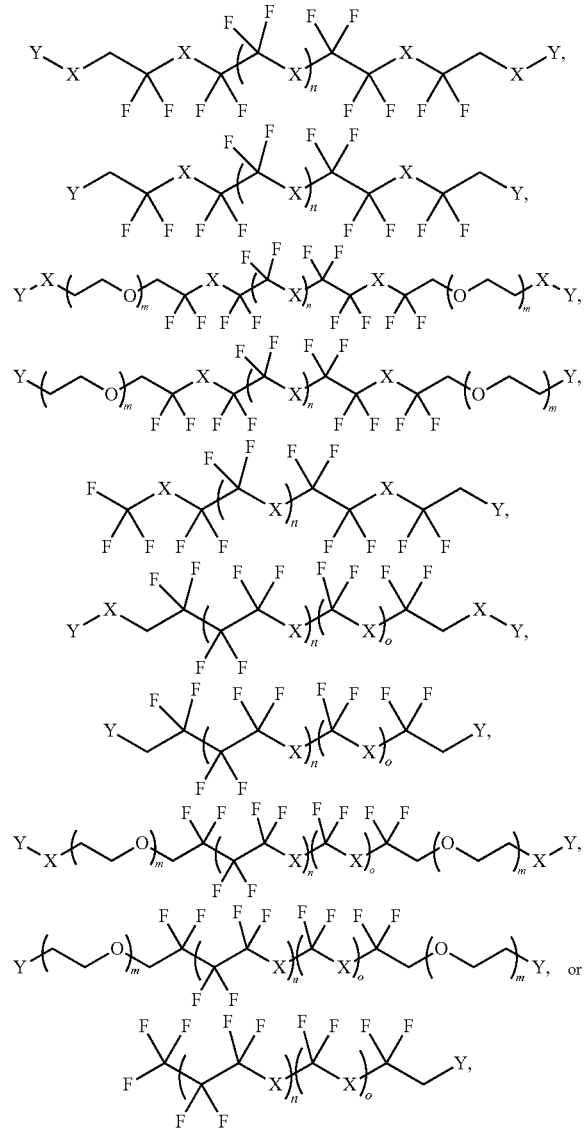

wherein each X is individually $CF_2$ or O, wherein each Y is polymerizable group, wherein n is from 0-100, wherein o is from 0-100, and wherein each m is individually from 1-30.

2. The method of claim 1, wherein the method further comprises the step of removing the fluorinated ionic polymer network comprising the absorbed polyfluorinated alkyl compound from the water.

3. The method of claim 2, wherein the method further comprises the step of separating the absorbed polyfluorinated alkyl compound from the fluorinated ionic polymer network.

4. The method of claim 1, wherein the fluorinated ionic polymer network is a fluorinated cationic polymer network.

5. The method of claim 1, wherein the fluorinated ionic polymer network is a fluorinated anionic polymer network.

6. The method of claim 1, wherein the fluorinated ionic polymer network is a fluorinated zwitterionic polymer network.

7. The method of claim 1, wherein the fluorinated ionic polymer network is a co-polymer made from a monomer comprising fluorine and a monomer comprising an ion-generating moiety.

8. The method of claim 7, wherein the ion-generating moiety is an amine, imidazole, benzimidazole, guanidinium, triazole, pyridine, diazine, triazine, thiol, thioether, phosphorane, or phosphine.

9. The method of claim 1, wherein the fluorinated ionic polymer network comprises a quaternary ammonium or quaternary phosphonium.

10. The method of anyone of claim 1, wherein the polymerizable group is acrylate, methacrylate, acrylamide, methacrylamide, vinylcarbonate, vinylcarbamate, vinyl ester, vinyl benzyl, vinyl halobenzyl, vinyl ether, epoxide, oxirane, hydroxyl, or isocyanate.

11. The method of claim 1, wherein the fluorinated ionic polymer network is in the form of a particle having a mean average diameter from 5 nm to 10 cm.

12. The method of claim 1, wherein the fluorinated ionic polymer network is a membrane or part of a membrane.

13. A method of removing a polyfluorinated alkyl compound from water, the method comprising absorbing the polyfluorinated alkyl compound from the water with a resin comprising a fluorinated ionic polymer network, wherein the fluorinated ionic polymer network is a co-polymer made from a monomer comprising fluorine and a monomer comprising an ion, wherein the monomer comprising fluorine has a structure:

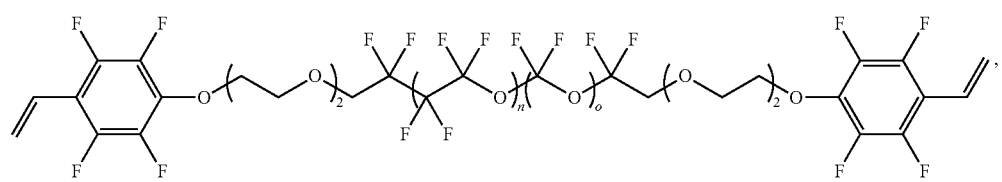

wherein n is from 0-100 and o is from 0-100.

14. The method of claim 13, wherein the monomer comprising an ion generating moiety has a structure:

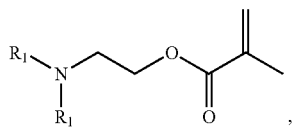

wherein each $R_1$ group independently is H or C1-C3 alkyl.

15. The method of claim 13, wherein the monomer comprising an ion generating moiety has a structure:

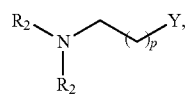

wherein each $R_2$ group independently is H, C1-C6 alkyl, C1-C6 fluoroalkyl, aryl, or fluoroaryl,
wherein p is from 0-11, and
wherein Y is a polymerizable group.

16. The method of claim 13, wherein the monomer comprising an ion has a structure:

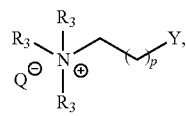

wherein each $R_3$ group independently is H, C1-C6 alkyl, C1-C6 fluoroalkyl, aryl, or fluoroaryl,
wherein p is from 0-11,
wherein Y is a polymerizable group, and
wherein Q is a counter-ion.

17. The method of claim 13, wherein the monomer comprising an ion has a structure;

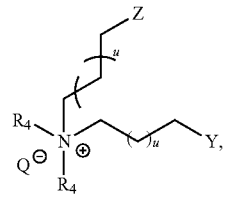

wherein each $R_4$ group independently is H, C1-C6 alkyl, C1-C6 fluoroalkyl, aryl, or fluoroaryl,
wherein each u is independently from 0-10,
wherein Y is a polymerizable group,
wherein Z is an anionic group or a polymerizable group, and
wherein Q is a counter-ion.

* * * * *